US012276638B2

(12) United States Patent
Owens et al.

(10) Patent No.: US 12,276,638 B2
(45) Date of Patent: Apr. 15, 2025

(54) SYSTEMS, METHODS, AND MEDIA FOR GENERATING ALERTS OF WATER HAMMER EVENTS IN STEAM PIPES

(71) Applicant: Latency, LLC, Hingham, MA (US)

(72) Inventors: Peter Owens, Hingham, MA (US); David Micallef, Rabat (MT)

(73) Assignee: Latency, LLC, Hingham, MA (US)

( * ) Notice: Subject to any disclaimer, the term of this patent is extended or adjusted under 35 U.S.C. 154(b) by 126 days.

(21) Appl. No.: 17/215,812

(22) Filed: Mar. 29, 2021

(65) Prior Publication Data

US 2021/0215645 A1 Jul. 15, 2021

Related U.S. Application Data

(63) Continuation-in-part of application No. 16/796,607, filed on Feb. 20, 2020.

(Continued)

(51) Int. Cl.
*G01N 29/46* (2006.01)
*F17D 1/06* (2006.01)
(Continued)

(52) U.S. Cl.
CPC .............. *G01N 29/46* (2013.01); *F17D 1/06* (2013.01); *G01N 29/12* (2013.01); *G06N 3/04* (2013.01);
(Continued)

(58) Field of Classification Search
CPC .. G01N 29/46; G01N 29/12; G01N 2291/021; G01N 2291/044;
(Continued)

(56) References Cited

U.S. PATENT DOCUMENTS

| 4,679,947 A | 7/1987 | Miller et al. |
| 4,898,022 A | 2/1990 | Yumoto et al. |

(Continued)

FOREIGN PATENT DOCUMENTS

| EA | 029117 | * 2/2018 | ............... G01P 5/24 |
| EP | 1705468 | 9/2006 | |

(Continued)

OTHER PUBLICATIONS

Margie Moschetti, "Quick Reference Guide: Testing Steam Traps", https://www.control-specialties.com/blog/testing-steam-traps/, 2016, 4 pages.*

(Continued)

*Primary Examiner* — Alexander Satanovsky
(74) *Attorney, Agent, or Firm* — Byrne Poh LLP

(57) ABSTRACT

Mechanism, which can include systems, methods, and media, for generating an alert of a water hammer event in a steam pipe are provided, the mechanisms comprising: sampling an accelerometer coupled to a steam pipe to provide accelerometer data; determining that the accelerometer data meets or exceeds a threshold; and generating an alert that a water hammer event has occurred based at least in part on the accelerometer data. In some of the mechanisms, the sampling of the accelerometer is performed for a given period of time, and the mechanisms further comprise sampling an ultrasonic sensor for the given period of time to provide ultrasonic sensor data, and wherein the generating the alert is based at least in part on the accelerometer data and the ultrasonic sensor data.

15 Claims, 19 Drawing Sheets

Related U.S. Application Data

(60) Provisional application No. 63/000,675, filed on Mar. 27, 2020, provisional application No. 62/808,113, filed on Feb. 20, 2019.

(51) Int. Cl.
  *G01N 29/12* (2006.01)
  *G06N 3/04* (2023.01)
  *G08B 21/18* (2006.01)

(52) U.S. Cl.
  CPC ..... *G08B 21/182* (2013.01); *G01N 2291/021* (2013.01); *G01N 2291/044* (2013.01)

(58) Field of Classification Search
  CPC ....... G01N 29/4481; G01N 2291/0258; G01N 29/14; F17D 1/06; G06N 3/04; G06N 3/08; G08B 21/182; G06Q 10/0639; G06Q 10/0637; G06Q 10/20; F16T 1/48
  See application file for complete search history.

(56) References Cited

U.S. PATENT DOCUMENTS

| | | | |
|---|---|---|---|
| 5,154,080 A | 10/1992 | Hill et al. | |
| 5,257,545 A | 11/1993 | Au-Yang | |
| 5,533,383 A | 7/1996 | Greene et al. | |
| 5,587,534 A | 12/1996 | McColskey et al. | |
| 5,650,943 A | 7/1997 | Powell et al. | |
| 5,798,459 A | 8/1998 | Ohba et al. | |
| 6,145,529 A | 11/2000 | Hellman et al. | |
| 6,189,384 B1 | 2/2001 | Piety et al. | |
| 6,220,098 B1 | 4/2001 | Johnson et al. | |
| 6,247,353 B1 | 6/2001 | Battenberg et al. | |
| 6,332,112 B1 | 12/2001 | Shukunami et al. | |
| 6,412,352 B1 | 7/2002 | Evans et al. | |
| 6,571,180 B1 | 5/2003 | Turner et al. | |
| 6,581,466 B1 | 6/2003 | Costley et al. | |
| 6,923,063 B2 | 8/2005 | Komninos | |
| 6,988,411 B2 | 1/2006 | Gysling et al. | |
| 7,197,938 B2 | 4/2007 | Gysling et al. | |
| 7,249,525 B1 | 7/2007 | Engel | |
| 7,261,002 B1 | 8/2007 | Gysling et al. | |
| 7,290,450 B2 | 11/2007 | Brown et al. | |
| 7,664,610 B2 | 2/2010 | Anderson et al. | |
| 7,672,794 B2 | 3/2010 | Gysling et al. | |
| 8,050,875 B2 | 11/2011 | Kraschnia et al. | |
| 8,245,576 B2 | 8/2012 | Komninos | |
| 8,297,561 B1* | 10/2012 | Montplaisir | G01L 5/0052 248/58 |
| 8,632,244 B2 | 1/2014 | Bar-Cohen et al. | |
| 8,707,785 B2 | 4/2014 | Goodman et al. | |
| 9,157,829 B2 | 10/2015 | Spasova | |
| 9,310,412 B2 | 4/2016 | Arunachalam et al. | |
| 9,442,094 B2 | 9/2016 | Dipen et al. | |
| 10,620,170 B2 | 4/2020 | Owens et al. | |
| 2002/0139191 A1 | 10/2002 | Hedeen et al. | |
| 2004/0024544 A1 | 2/2004 | Guebert et al. | |
| 2005/0011278 A1 | 1/2005 | Brown et al. | |
| 2005/0050956 A1 | 3/2005 | Gysling et al. | |
| 2005/0087016 A1 | 4/2005 | Gilmore et al. | |
| 2005/0155429 A1 | 7/2005 | Griessler et al. | |
| 2006/0042387 A1 | 3/2006 | Komninos | |
| 2006/0118647 A1 | 6/2006 | Cheskaty et al. | |
| 2006/0118648 A1 | 6/2006 | Armstrong et al. | |
| 2007/0028693 A1 | 2/2007 | Komninos | |
| 2009/0043530 A1* | 2/2009 | Sittler | G01M 13/028 702/141 |
| 2010/0153068 A1 | 6/2010 | Armstrong et al. | |
| 2011/0316707 A1 | 12/2011 | Gaines et al. | |
| 2013/0103326 A1 | 4/2013 | Von Drasek et al. | |
| 2013/0167783 A1 | 7/2013 | Poczka et al. | |
| 2013/0173178 A1* | 7/2013 | Poczka | G06F 17/00 702/182 |
| 2013/0305827 A1 | 11/2013 | Kessler et al. | |
| 2014/0085100 A1 | 3/2014 | Rich et al. | |
| 2014/0090712 A1 | 4/2014 | Karschnia et al. | |
| 2014/0311245 A1 | 10/2014 | Horoshenkov et al. | |
| 2015/0355003 A1 | 12/2015 | Saeger et al. | |
| 2016/0098021 A1 | 4/2016 | Zornio et al. | |
| 2016/0098037 A1 | 4/2016 | Zornio et al. | |
| 2016/0116392 A1 | 4/2016 | Carpenter et al. | |
| 2016/0371316 A1* | 12/2016 | Okanohara | G06N 3/044 |
| 2016/0377500 A1 | 12/2016 | Bizub | |
| 2017/0370606 A1 | 12/2017 | Conner et al. | |
| 2018/0128424 A1 | 5/2018 | Fujiwara et al. | |
| 2018/0217110 A1 | 8/2018 | Owens et al. | |
| 2018/0306633 A1* | 10/2018 | Bar-Cohen | G01N 29/42 |
| 2019/0390990 A1* | 12/2019 | Krywyj | G01N 29/041 |
| 2020/0033167 A1 | 1/2020 | Sexton et al. | |
| 2021/0304077 A1* | 9/2021 | Bergkvist | G06N 20/00 |

FOREIGN PATENT DOCUMENTS

| | | |
|---|---|---|
| GB | 2497994 | 7/2013 |
| JP | 2013140576 | 7/2013 |
| JP | 2013156161 | 8/2013 |
| WO | WO 2006063197 | 6/2006 |
| WO | WO 2013108086 | 7/2013 |
| WO | WO 2014052141 | 4/2014 |
| WO | WO 2016038527 | 3/2016 |
| WO | WO 2018019887 | 2/2018 |

OTHER PUBLICATIONS

International Search Report and Written Opinion dated Jun. 11, 2021 in International Patent Application No. PCT/US2021/024588, pp. 1-13.
Examination Report dated Dec. 19, 2022 in EP Patent Application No. 18743941.9, pp. 1-6.
Extended European Search Report dated Jul. 24, 2020 in EP Patent Application No. 18743941.9, pp. 1-10.
Extended European Search Report dated Dec. 5, 2022 in EP Patent Application No. 20759519.0, pp. 1-8.
International Preliminary Report on Patentability dated Jul. 30, 2019 in International Patent Application No. PCT/US2018/016013, pp. 1-7.
International Preliminary Report on Patentability dated Sep. 2, 2021 in International Patent Application No. PCT/US2020/019095, pp. 1-9.
International Preliminary Report on Patentability dated Oct. 6, 2022 in International Application No. PCT/US2021/024588, pp. 1-12.
International Search Report and Written Opinion dated Apr. 5, 2018 in International Patent Application No. PCT/US2018/016013, pp. 1-9.
International Search Report and Written Opinion dated May 18, 2020 in International Patent Application No. PCT/US2020/019095, pp. 1-14.
Notice of Allowance dated Jan. 11, 2021 in U.S. Appl. No. 16/799,386, pp. 1-66.
Notice of Allowance dated Jan. 21, 2020 in U.S. Appl. No. 15/884,157, pp. 1-21.
Notice of Allowance dated Jul. 15, 2020 in CA Patent Application No. 3074672, pp. 1.
Office Action dated Apr. 14, 2022 in U.S. Appl. No. 16/796,607, pp. 1-13.
Office Action dated Aug. 14, 2019 in U.S. Appl. No. 15/884,157, pp. 1-32.
Office Action dated Sep. 1, 2020 in U.S. Appl. No. 16/799,386, pp. 1-29.
Extended European Search Report dated May 7, 2024 in EP Patent Application No. 21775546.1, pp. 1-7.
Examination Report dated Dec. 9, 2024 in EP Patent Application No. 18743941.9, pp. 1-5.

* cited by examiner

SECTION A-A
SCALE 1 / 2

SYSTEMS, METHODS, AND MEDIA FOR GENERATING ALERTS OF WATER HAMMER EVENTS IN STEAM PIPES

CROSS REFERENCE TO RELATED APPLICATIONS

This application claims the benefit of U.S. Provisional Patent Application No. 63/000,675, filed Mar. 27, 2020, and is a continuation-in-part of U.S. patent application Ser. No. 16/796,607, filed Feb. 20, 2020, which claims the benefit of U.S. Provisional Patent Application No. 62/808,113, filed Feb. 20, 2019, each of which is hereby incorporated by reference herein in its entirety.

This application is related to U.S. Provisional Patent Application No. 62/712,011, filed Jul. 30, 2018, U.S. patent application Ser. No. 15/884,157, filed Jan. 30, 2018, U.S. Provisional Patent Application No. 62/452,034, filed Jan. 30, 2017, and U.S. Provisional Patent Application No. 62/483,756, filed Apr. 10, 2017, each of which is hereby incorporated by reference herein in its entirety.

BACKGROUND

Monitoring mechanical devices for signs of failure is an essential part of equipment maintenance. This is especially true in industry where machines can be operated for very long durations and any failure of the equipment can be very costly.

For example, steam traps are an essential part of steam systems. A steam trap removes condensate (condensed steam) and non-condensable gases from the steam system without allowing steam to escape. Unfortunately, when steam traps fail open, steam can escape resulting in wasted energy. Steam traps can also fail closed, allowing excess condensate to build up and precipitate a water hammer event.

Likewise, bearings are an essential part of machines containing rotating components. The bearings make it easy for the parts to rotate. Unfortunately, when bearings fail, rotating parts in machines can stop turning, causing the equipment to stop operating.

Accordingly, it is desirable to provide new mechanisms for detecting abnormalities in equipment.

SUMMARY

In accordance with some embodiments, systems, methods, and media for generating an alert of a water hammer event in a steam pipe are provided.

In some embodiments, systems for generating an alert of a water hammer event in a steam pipe a provided, the systems comprising: a memory; and a hardware processor that is coupled to the memory and that is configured to: sample an accelerometer coupled to a steam pipe to provide accelerometer data; determine that the accelerometer data meets or exceeds a threshold; and generate an alert that a water hammer event has occurred based at least in part on the accelerometer data. In some of these embodiments, the sampling of the accelerometer is performed for a given period of time, the hardware processor is further configured to sample an ultrasonic sensor for the given period of time to provide ultrasonic sensor data, and the generating the alert is based at least in part on the accelerometer data and the ultrasonic sensor data. In some of these embodiments, the hardware processor is further configured to perform a Fast Fourier Transform (FFT) operation on the accelerometer data to produce first FFT output data and perform a FFT operation on the ultrasonic sensor data to produce second FFT output data, and the generating the alert is based at least in part on the first FFT output data and the second FFT output data. In some of these embodiments, the hardware processor is further configured to use a machine learning classifier to indicate a likelihood that a water hammer event occurred and the generating the alert is based at least in part an output of the machine learning classifier. In some of these embodiments, the machine learning classifier is a neural network. In some of these embodiments, the hardware processor is configured to, in response to the determining that the accelerometer data meets or exceeds the threshold, increase the sample frequency at which the accelerometer is sampled.

In some embodiments, methods of generating an alert of a water hammer event in a steam pipe are provided, the methods comprising: sampling an accelerometer coupled to a steam pipe to provide accelerometer data; determining that the accelerometer data meets or exceeds a threshold using a hardware processor; and generating an alert that a water hammer event has occurred based at least in part on the accelerometer data. In some of these embodiments the sampling of the accelerometer is performed for a given period of time, and the method further comprises sampling an ultrasonic sensor for the given period of time to provide ultrasonic sensor data, and the generating the alert is based at least in part on the accelerometer data and the ultrasonic sensor data. In some of these embodiments, the method further comprises performing a Fast Fourier Transform (FFT) operation on the accelerometer data to produce first FFT output data and performing a FFT operation on the ultrasonic sensor data to produce second FFT output data, the generating the alert is based at least in part on the first FFT output data and the second FFT output data. In some of these embodiments, the method further comprises using a machine learning classifier to indicate a likelihood that a water hammer event occurred and the generating the alert is based at least in part an output of the machine learning classifier. In some of these embodiments, the machine learning classifier is a neural network. In some of these embodiments, the method further comprises, in response to the determining that the accelerometer data meets or exceeds the threshold, increasing the sample frequency at which the accelerometer is sampled.

In some embodiments, non-transitory computer-readable media containing computer executable instructions that, when executed by a processor, cause the processor to perform a method for generating an alert of a water hammer event in a steam pipe are provided, the method comprising: sampling an accelerometer coupled to a steam pipe to provide accelerometer data; determining that the accelerometer data meets or exceeds a threshold; and generating an alert that a water hammer event has occurred based at least in part on the accelerometer data. In some of these embodiments, the sampling of the accelerometer is performed for a given period of time, the method further comprises sampling an ultrasonic sensor for the given period of time to provide ultrasonic sensor data, and the generating the alert is based at least in part on the accelerometer data and the ultrasonic sensor data. In some of these embodiments, the method further comprises performing a Fast Fourier Transform (FFT) operation on the accelerometer data to produce first FFT output data and performing a FFT operation on the ultrasonic sensor data to produce second FFT output data, and the generating the alert is based at least in part on the first FFT output data and the second FFT output data. In some of these embodiments, the method further comprises using a machine learning classifier to indicate a likelihood that a water hammer event occurred and the generating the alert is based at least in part an output of the machine learning classifier. In some of these embodiments, the machine learning classifier is a neural network. In some of these embodiments, the method further comprises, in response to the determining that the accelerometer data meets or exceeds the threshold, increasing the sample frequency at which the accelerometer is sampled.

DETAILED DESCRIPTION

Systems, methods, and media for monitoring steam traps for failure are provided.

Figure 1:
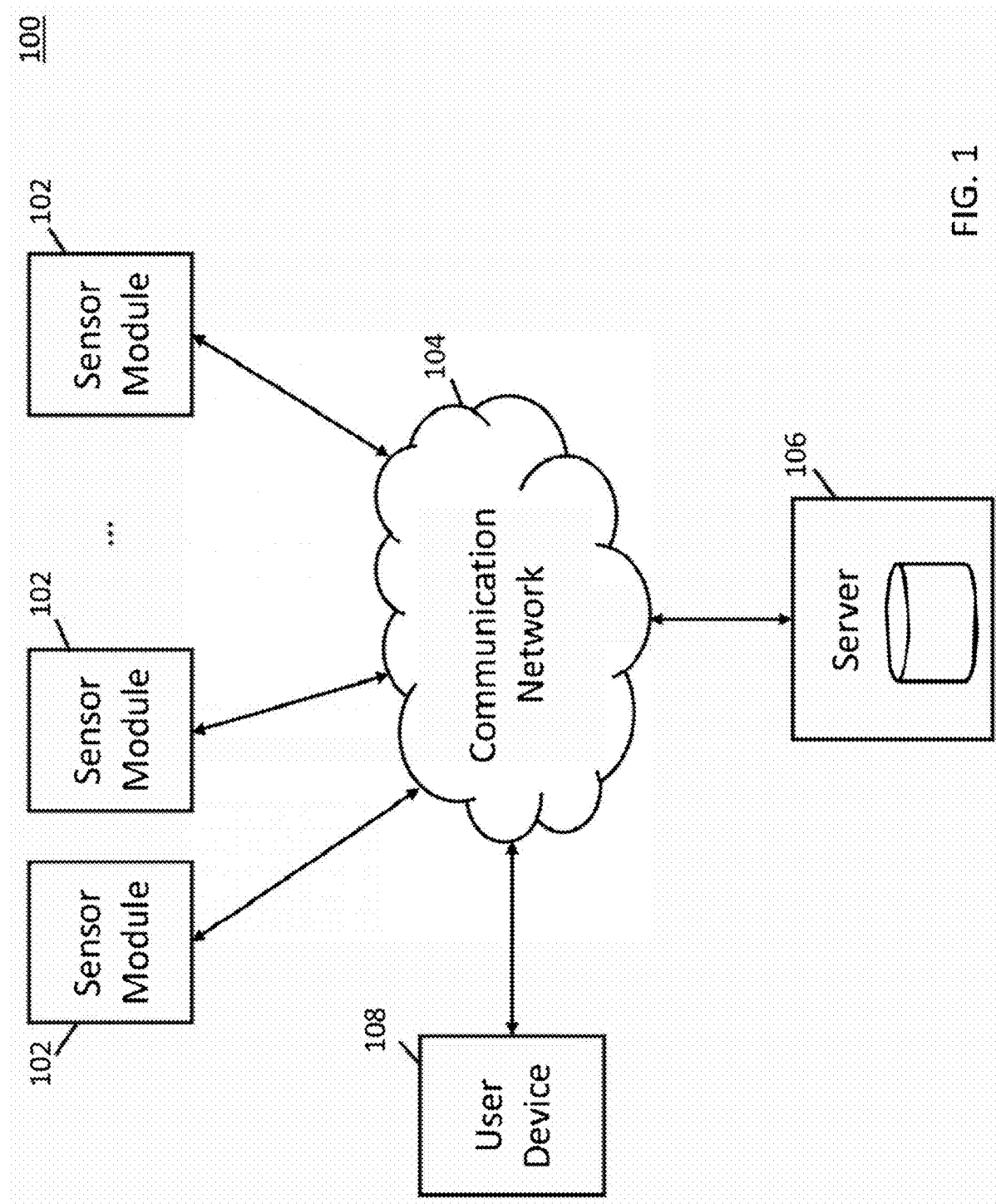
FIG. 1 is a block diagram of an example of a system for detecting abnormalities in equipment that emit ultrasonic energy into a solid medium during failure in accordance with some embodiments.

Turning to FIG. 1, an example 100 of a system for detecting abnormalities in equipment that emit ultrasonic energy into a solid medium during failure is illustrated. As shown, system 100 includes one or more sensor modules 102, a communication network 104, a server 106, and a user device 108.

Sensor modules 102 can be any suitable sensor modules, and any suitable number of sensor modules can be used. For example, in some embodiments, sensor modules 102 can be the sensor modules described below in connection with FIG. 2.

Communication network 104 can be any suitable communication network and/or combination of communication networks. For example, communication network 104 can be wired and/or wireless, and can include the Internet, telephone networks, cable television networks, mobile phone networks, satellite networks, radio networks, mesh networks, low-power wide-area networks (LPWANs), and/or any other suitable mechanisms for communicating information. More particularly, for example, communication network 104 can include the Senet Network from Senet, Inc. of Portsmouth, New Hampshire. As another example, communication network 104 can include the MachineQ network available from Comcast of Philadelphia, Pa.

Server 106 can be any suitable device for receiving data from sensor modules 102, controlling sensor modules 102, storing the data, processing the data, providing information to a user via user device 108, and/or performing any other suitable functions. Any suitable number of servers can be used, and the functions described here as being performed by the server can be performed across two or more servers, in some embodiments. In some embodiments, server 106 can be a general-purpose computer or a special purpose computer. In some embodiments, server 106 can include, or be connected to, a database.

User device 108 can be any suitable device for accessing server 106 in order to review information from server 106, control settings for the sensor modules, and/or perform any other suitable functions and any suitable number of user devices can be used. In some embodiments, user device 108 can be a general-purpose computer or a special purpose computer, such as a smartphone.

Figure 2:
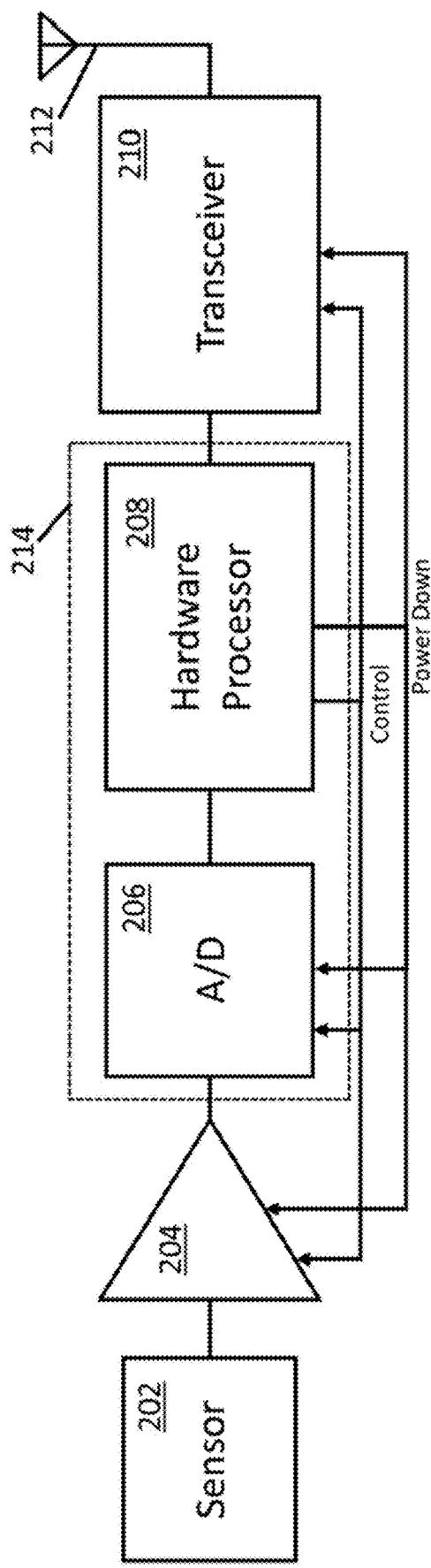
FIG. 2 is a block diagram of an example of a sensor module for detecting abnormalities in equipment that emit ultrasonic energy into a solid medium during failure in accordance with some embodiments.

Turning to FIG. 2, an example 200 of a sensor module that can be used in accordance with some embodiments is illustrated. As shown, sensor module 200 can include a sensor 202, an amplifier 204, an analog-to-digital converter 206, a hardware processor 208, a transceiver 210, and an antenna 212. In some embodiments, analog-to-digital converter 206 and hardware processor 208 can be combined into a single device 214.

Sensor 202 can be any suitable sensor or transducer for detecting ultrasonic energy in a solid medium during failure. For example, in some embodiments, sensor 202 can be a Piezo speaker configured to act as a microphone. More particularly, the sensor can be Piezoelectric diaphragm model number 7BB-27-4L0 from Murata Manufacturing Co., Ltd. of Tokyo, Japan.

Figure 8:
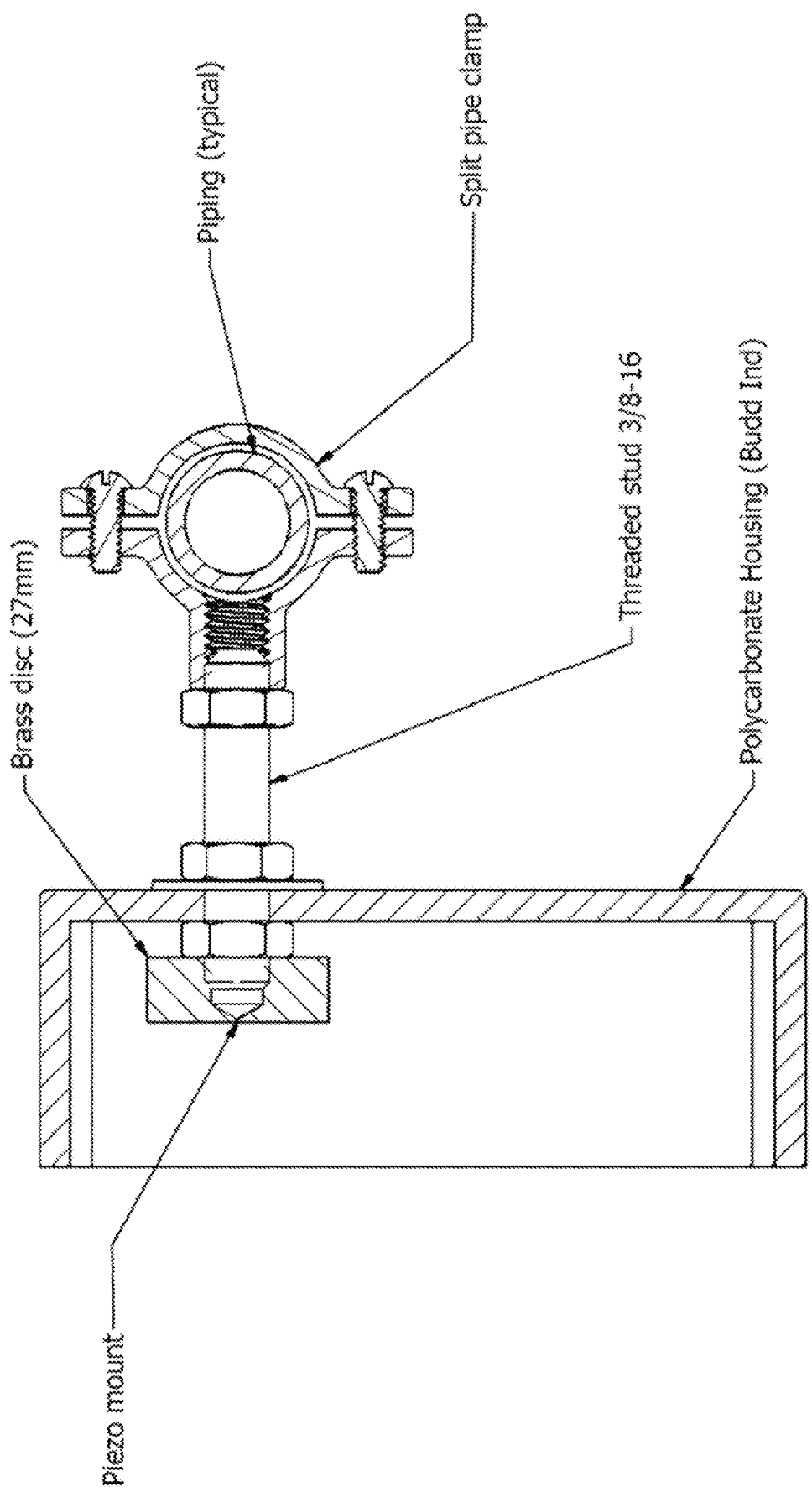
FIG. 8 is an illustration of an example of a mechanism for coupling a sensor to a pipe in accordance with some embodiments.

As shown in FIG. 8, in some embodiments, sensor 202 can be acoustically coupled (which includes any coupling capable of passing signals that can be detected by sensor 202) to a piece of equipment (i.e., for purposes of illustration, a steam trap) by way of a brass disc (to which the sensor can be glued), a stud (on which the brass disc is threaded), a split pipe clamp (into which the stud is screwed), and a pipe at the output of the steam trap (to which the split pipe clamp is clamped). In some embodiments, sensor 202 can be coupled to acoustically coupled to a piece of equipment (e.g., a steam trap) in any other suitable manner.

Amplifier 204 can be any suitable amplifier that can be configured to amplify the signals generated by sensor 202. For example, amplifier 204 can be a variable gain amplifier having any suitable range(s) of gain and any suitable mechanisms for automatically adjusting the gain (Automatic Gain Control). More particularly, for example, amplifier 204 can be configured to have a gain between 40 dB and 60 dB. In some embodiments, for example, amplifier 204 can be implemented using microphone amplifier model number MAX9814ETD+T available from Maxim Integrated of San Jose, Calif.

Analog-to-digital converter 206 can be any suitable analog-to-digital converter for converting the analog signals output by amplifier 204 into digital format usable by the hardware processor.

Hardware processor 208 can be any suitable processor for controlling the functions of sensor module 200 as described herein. For example, in some embodiments, hardware processor 208 can be a microprocessor, a microcontroller, a digital signal processor, and/or any other suitable device for performing the functions described herein. In some embodiments, hardware processor 208 can include any suitable form of memory and/or storage for storing programs and/or data. In some embodiments, although not shown in FIG. 2, memory and/or storage can be provided in the sensor module that is separate from the hardware processor.

As mentioned above, analog-to-digital converter 206 and hardware processor 208 can be implemented, in some embodiments, as one device 214. For example, in some embodiments, device 214 can be implemented using model STM32F051R8T6TR available from STMicroelectronics of Geneva, Switzerland.

Transceiver 210 can be any suitable transceiver for communicating data to and/or from sensor module 200, and may utilize wireless or wire-based communication technologies. For example, in some embodiments, transceiver 210 may be implemented using a model RN2903 Module from Microchip Technology Inc. of Chandler, Ariz.

In some embodiments, analog-to-digital converter 207, hardware processor 208, and transceiver 210 can be implemented as a single device, such as part number CMWX1ZZABZ-078 available from Murata Manufacturing Company, Ltd. of Kyoto, Japan.

In some embodiments, transceiver 210 may be implemented as only a transmitter. In some embodiments, transceiver 210 may be implemented as a separate transmitter and a separate receiver.

Antenna 212 can be any suitable antenna implemented in any suitable manner.

Although not shown in FIG. 2, in some embodiments, sensor module 200 can include one or more additional or alternative sensors, such as location, light, heat, humidity, pressure, occupancy, acceleration, and/or noise sensors, in some embodiments. Additional amplifiers and analog-to-digital converters can be provided for each of these sensors, or an analog multiplexer can be provided between the sensors and the amplifier, to facilitate these sensors being sampled by the hardware processor.

Also, although not shown in FIG. 2, a battery and/or power supply may be included to power the components shown.

Generally speaking, in some embodiments, during operation, hardware processor 208 can be configured to control the operation of amplifier 204, analog-to-digital converter 206, and transceiver 210 via one or more control signals. In some embodiments, thus, under the control of the hardware processor, the amplifier can amplify signals from the sensor(s), the analog-to-digital converter can sample and digitize the amplified signals, the hardware processor can process the digitized signals and provide resulting data to the transceiver, and the transceiver can transmit the data via communication network 104 (FIG. 1) to server 106 (FIG. 1). In some embodiments, the transceiver can also receive via the communication network from the server control signals and provide those signals to the hardware processor. The control signals can be used in some embodiments to control the configuration and programming of the hardware processor, and the configuration settings of the amplifier, the analog-to-digital converter, and the transceiver, and thereby alter the operation of the sensor module.

Figure 3:
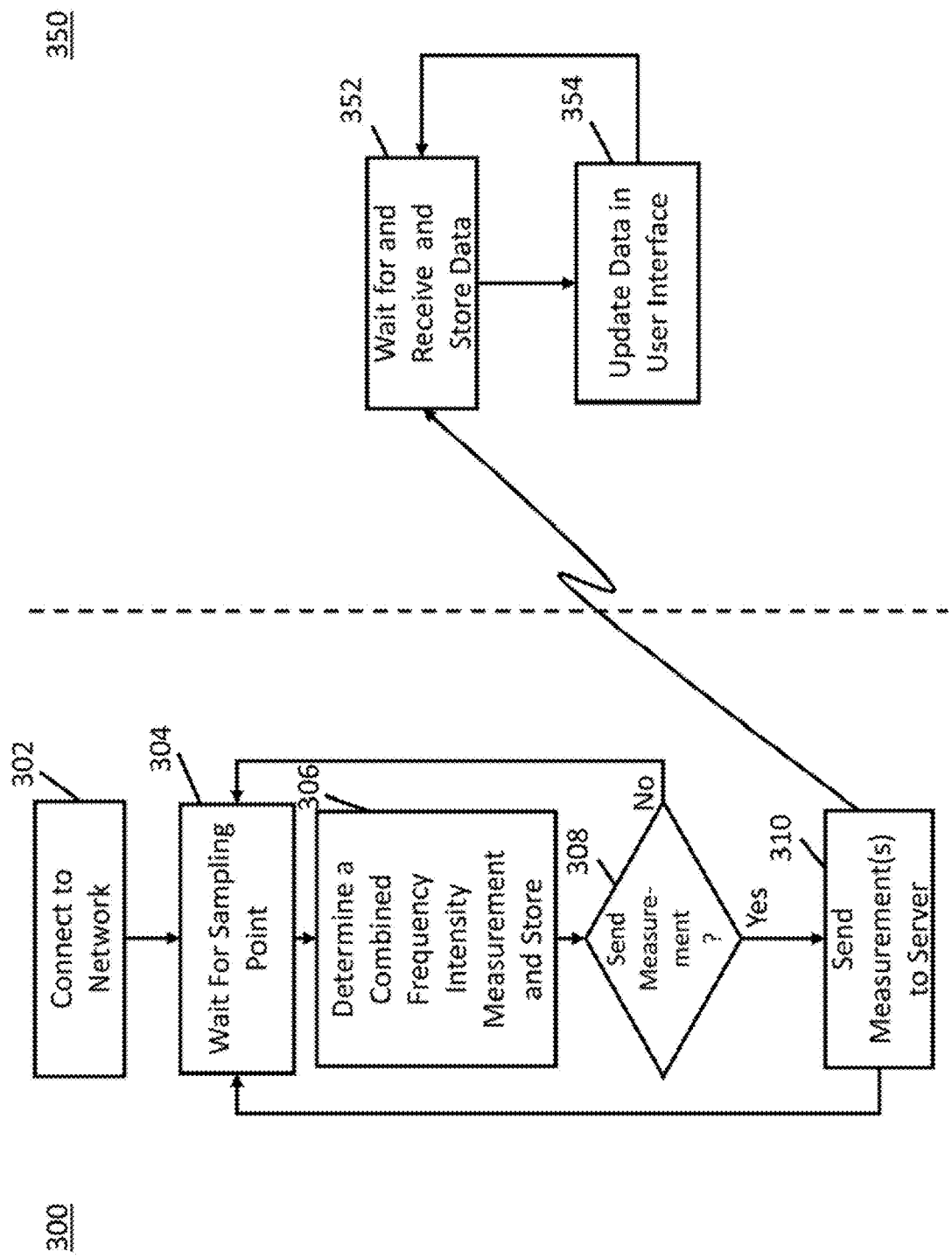
FIG. 3 is a flow diagram of an example of a process for detecting abnormalities in equipment that emit ultrasonic energy into a solid medium during failure in accordance with some embodiments.

Turning to FIG. 3, examples 300 and 350 of process that can run in sensor module 102 and server 106, respectively, to transfer equipment monitoring data from the sensor module to the server in accordance with some embodiments are shown.

As illustrated, in process 300, at 302 the process can begin by connecting to communication network 104 (FIG. 1). This can be performed in any suitable manner.

At 304, process can then wait for a sampling point for sampling the signals detected by sensor 202 (FIG. 2). Any suitable sampling points can be used in some embodiments. For example, sampling points can occur every minute in some embodiments. In some embodiments, sampling points need not be periodic.

Next, at 306, the process can determine a combined frequency intensity measurement for the sensor module. This measurement can be determined in any suitable manner. For example, in some embodiments, this measurement can be determined using the process described below in connection with FIG. 4.

Then, at 308, the process can determine whether stored combined frequency intensity measurement(s) is(are) to be sent to the server. This determination can be made on any suitable basis. For example, this determination can be made based on the passage of a period of time (e.g., 30 minutes) since the last sending of measurement(s) in some embodiments. As other examples, this determination can be based on available power in a battery or based on available memory in storage of the hardware processor.

If it is determined at 308 to send the measurement(s), then, at 310, process 300 can send the measurement(s) from the sensor module to the server. This can occur in any suitable manner. For example, this can occur by hardware processor 208 (FIG. 2) providing the data to transceiver 210 (FIG. 2) and instructing transceiver 210 (FIG. 2) to transmit the data via communication network 104 (FIG. 1) to server 106 (FIG. 1).

If it is determined at 308 to not send the data, or after sending the data at 310, process 300 can then loop back to 304.

At 352, process 350 can receive at the server the data sent at 308 from the sensor module.

Then at 354, process 350 can update the data in the user interface, as described below, and loop back to 352.

Figure 4:
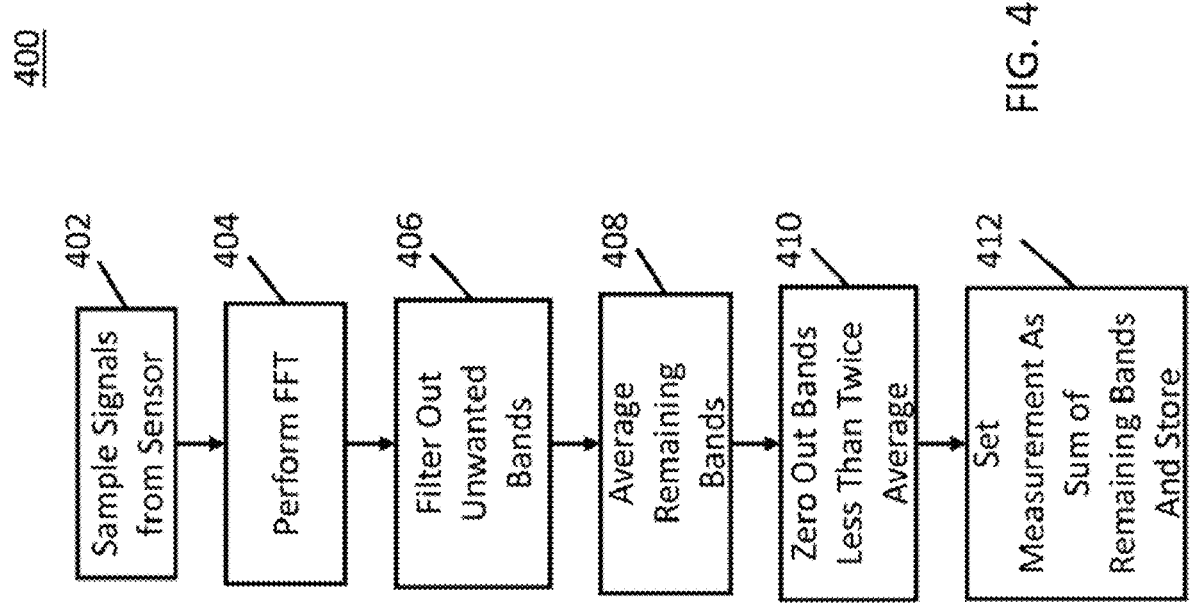
FIG. 4 is a flow diagram of an example of a process for determining a combined frequency intensity measurement in accordance with some embodiments.

Turning to FIG. 4, an example 400 of a process for determining a combined frequency intensity measurement in accordance with some embodiments is shown. As illustrated, process 400 begins by sampling the signals from sensor 202 (FIG. 2) at 402. Sampling the signals from sensor 202 can be performed in any suitable manner. For example, in some embodiments, sampling the signals can be performed by enabling amplifier 204 (FIG. 2) and analog-to-digital converter 206 (FIG. 2), and taking samples of the signal output from the amplifier at a sampling frequency of 253 kHz for a duration of 1013 microseconds.

Next, at 404, process 400 can perform a Fast Fourier Transform (FFT) on the sampled data. Any suitable parameters for the FFT can be used in some embodiments. For example, in some embodiments, when using a sampling frequency of 253 kHz, an FFT with a size of 256 can be provided with 128 bins (size/2) with a spectral line of 0.988 Khz (253 Khz/256 Khz).

Then, at 406, process 400 can filter out unwanted bands. For Example, in some embodiments, process 400 can ignore data in the FFT output bins for 0-19 kHz and 51-100 kHz.

At 408, the process can average the values of the FFT output bins in the wanted bins. For example, process 400 can average the values of the FFT output bins for 20 kHz to 50 kHz.

Next, at 410, process 400 can zero-out the FFT output bins for all of the wanted bins having values which are lower than twice the average.

Finally, at 412, process 400 can set as the combined frequency intensity measurement value the sum of the values of the wanted bins.

Although specific examples of values (e.g., for frequencies, durations, bin sizes, etc.) are provided in connection with FIG. 4, it should be apparent that these values can be changed in some embodiments.

In some embodiments, to save power, components of the sensor module can be turned off or put into a low power mode when not performing any functions. For example, at 304 (FIG. 3), while waiting for a sampling point, amplifier 204 (FIG. 2), analog-to-digital converter 206 (FIG. 2) and transceiver 210 (FIG. 2) can be powered-down, and hardware processor 208 (FIG. 2) can be put in a low power state in which only a timer is being monitored for when the processor is to wake up and branch to 306 of process 300. At 306, amplifier 204 (FIG. 2), analog-to-digital converter 206 (FIG. 2), and hardware processor 208 (FIG. 2) can be turned-on and transceiver 210 (FIG. 2) can remain powered-down. And, at 310, amplifier 204 (FIG. 2) and analog-to-digital converter 206 (FIG. 2) can be powered-down, hardware processor 208 (FIG. 2) can remain turned-on, and transceiver 210 (FIG. 2) can be turned-on.

In some embodiments, server 106 can send parameters, commands, executable code, and/or any other programs or data to sensor module 102. For example, in some embodiments, the server can send parameters specifying the sampling points (which can be specified as specific points in time, as a time interval, and/or in any other suitable manner) (at 304 of FIG. 3), the amplifier gain, the analog-to-digital converter sampling frequency and/or duration (at 402 of FIG. 4), bands to be filtered (at 406 of FIG. 4) (e.g., in some embodiments, in may be desirable to filter out one or more bins of the FFT output due to noise present in those bins), the bands to be zeroed-out (at 410 of FIG. 4 (e.g., other than less than twice the average)), and/or when to send data (at 310 of FIG. 3).

In some embodiments, when monitoring a steam trap, for example, a sensor module can determine the frequency at which the steam trap to which it is connected is cycling between a non-discharge state and a discharge state. The frequency of cycling of the steam trap can be an indicator of the amount of condensate that the steam trap is processing. A frequency of cycling of zero can also indicate that a steam trap has failed in a stuck closed (non-discharge state) or stuck open (discharge state). The energy emitted by the trap and detected by the sensor module can indicate whether the traps is failed in a stuck closed (low energy emitted) or stuck open (high energy emitted) state. This frequency data can then be reported to the server, which can provide the information to a user via the user interface and user device.

Figure 5:
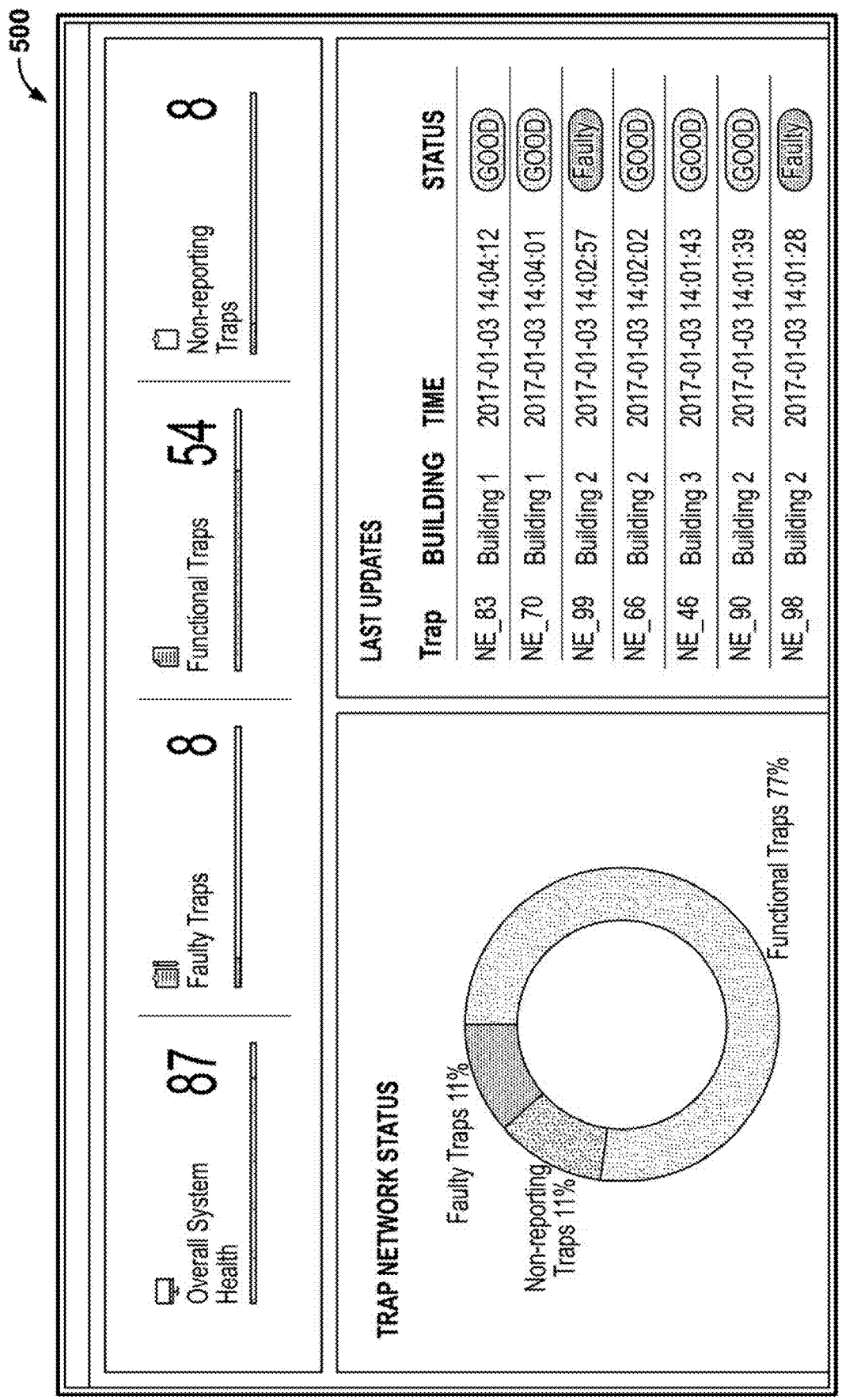
FIG. 5 is an illustration of an example of a user interface showing information on multiple pieces of equipment (steam traps as illustrated) in accordance with some embodiments.

Turning to FIG. 5, an example 500 of a user interface that can be generated by server 106 and presented on user device 108, or generated on and presented by user device 108 using data from server 106, in accordance with some embodiments is illustrated. As shown, this interface provides information for steam traps, though it could be altered to indicate information for any other suitable equipment. User interface 500 can present an overall health score (which can be, for example, the ratio of functional steam traps to total reporting sensor modules), the number of faulty steam traps, the number of functional steam traps, and the number of non-reporting sensor modules. The interface can also present the most-recent sensor module data, such as a steam trap identifier, a building identifier, a date and time, and a status. Any other suitable information can additionally or alternatively be shown.

A steam trap can be determined as being faulty in any suitable manner. For example, in some embodiments, a steam trap can be determined as being faulty when a measured combined frequency intensity measurement (or an average thereof) exceeds a given threshold value for more than a given period of time. In some such embodiments, any suitable threshold and any suitable period of time (include 0 seconds) can be used.

As another example, in some embodiments, to determine whether a steam trap is faulty, the following can be performed. First, during a 30-minute period (or any other suitable duration), the monitor (i.e., sensor module) can attempt to read 60 (or any other suitable number) consecutive measurements. The period at which these measurements are made, and the number of measurements, can be variable and set as part of the configuration in some embodiments (which can be set via a configuration downlink). Next, after these 60 measurements are collected, the monitor can measure the variance of the readings. This variance can be calculated using the following equation:

$$f(x) = \sum_{n=1}^{59} (4^{x_n - x_{(n+1)}})|$$

where n is an index to the measurements and x is a measurement value. The more the trap cycles the higher the variance is expected to be. A threshold can then be used on the variance to determine whether a trap is operating or whether it is failed. This threshold can variable, can set as part of the configuration, and can be changed during operation via a downlink. If a trap is determined as failed, then an approximation of its failure level is obtained by measuring the acoustic energy in the readings made.

Figure 6:
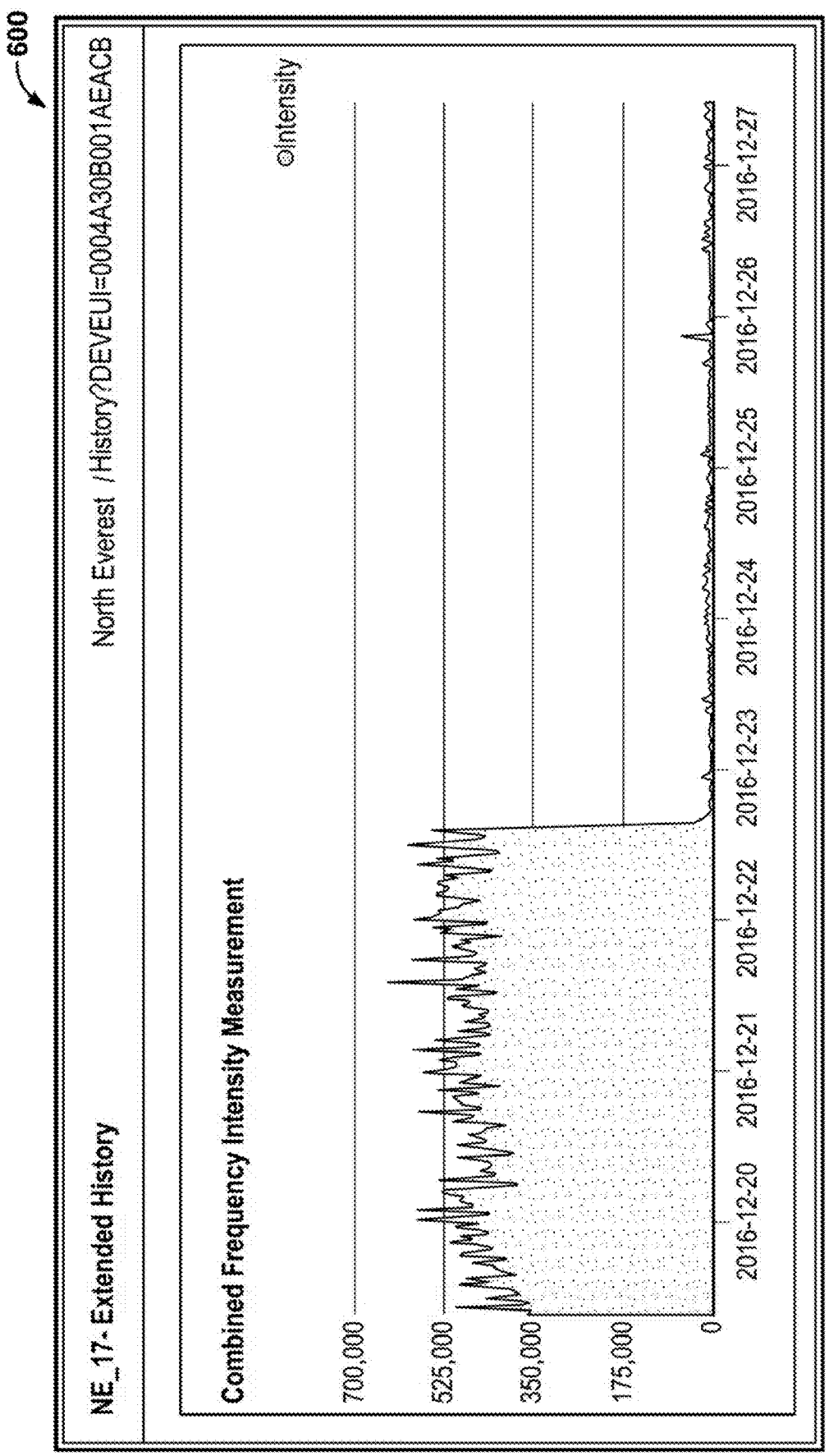
FIG. 6 is an illustration of an example of a user interface showing a combine frequency intensity measurement in accordance with some embodiments.

Turning to FIG. 6, another example 600 of a user interface that can be generated by server 106 and presented on user device 108, or generated on and presented by user device 108 using data from server 106, in accordance with some embodiments is illustrated. As shown, user interface 600 can present combined frequency intensity measurements for a piece of equipment (e.g., a steam trap) over a period of time. Any suitable period of time scale and any suitable intensity scale can be used in some embodiments. As can be seen in the illustrated example, the trap was repaired between 2016 Dec. 22 and 2016 Dec. 23, which resulted in a significant decrease in the combined frequency intensity measurements.

Figure 7:
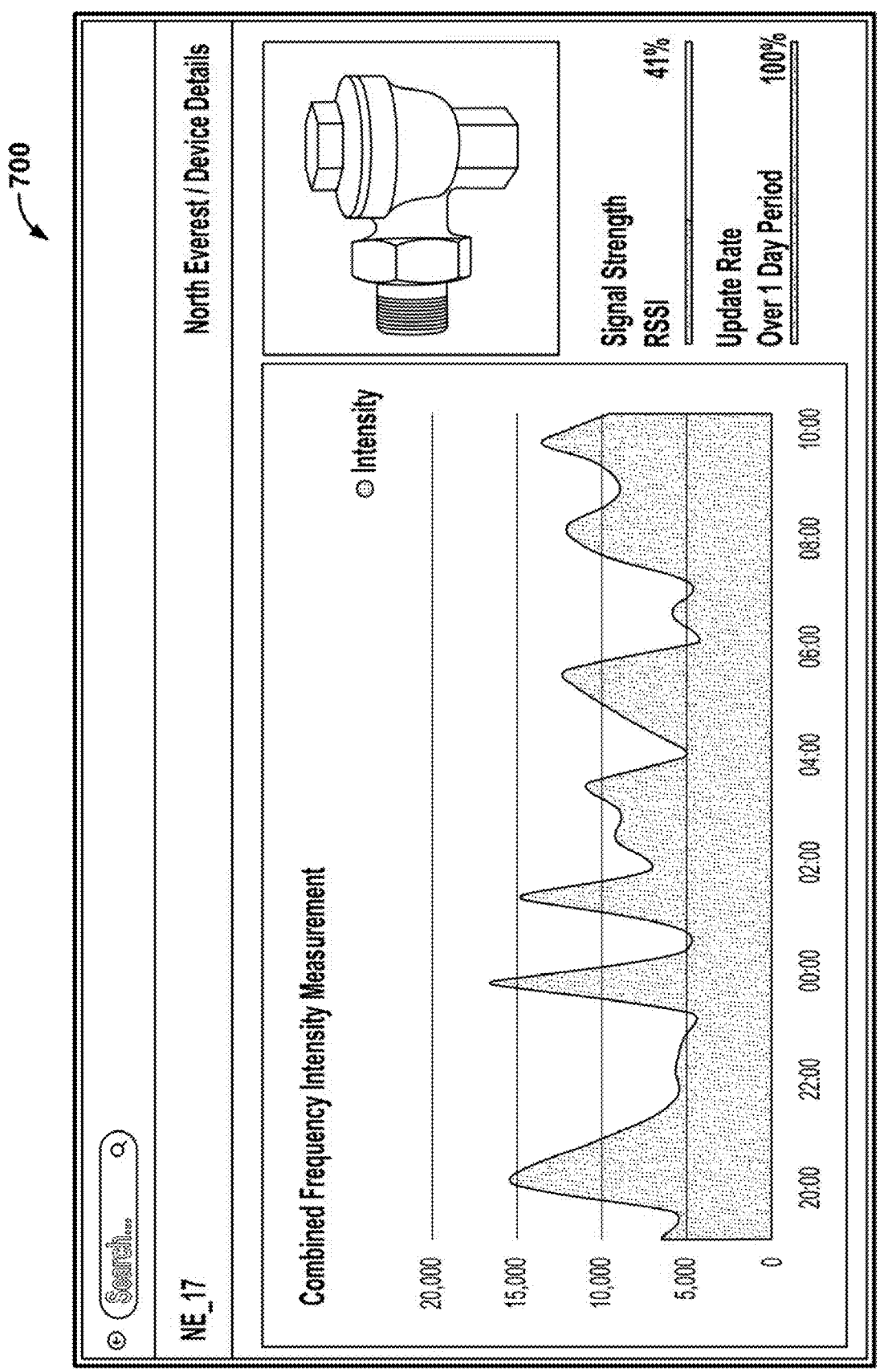
FIG. 7 is an illustration of an example of another user interface showing a combine frequency intensity measurement in accordance with some embodiments.

Turning to FIG. 7, another example 700 of a user interface that can be generated by server 106 and presented on user device 108, or generated on and presented by user device 108 using data from server 106, in accordance with some embodiments is illustrated. As shown, user interface 700, combined frequency intensity measurements for a piece of equipment (e.g., a steam trap) can also be presented on a smaller time scale (i.e., hourly rather than daily as in FIG. 6). As also shown, in some embodiments, a picture of a piece of equipment (e.g., a steam trap) representative of the equipment being monitored can be shown, a signal strength associated with the sensor module's transceiver can be shown, and an update rate for the sensor module can be shown. As further shown, by clicking on the "device details" link, a user can access more information about the equipment, such as location, manufacturer, pressure, pipe size, and/or any other suitable data.

In some embodiments, a user of the user interfaces in FIGS. 5-7 can set one or more thresholds at which alerts may be generated. Any suitable alert mechanism can be used. For example, alerts can be sent as an email, an SMS message, a push notification, an audible alarm, etc. Thresholds can be configured to detect one or more levels of combined frequency intensity measurements and/or intermittent combined frequency intensity measurement levels in some embodiments.

In some embodiments, any of the data described herein can be provided to and/or received from one or more external systems via any suitable application programming interface (API). Such an API can be used to send or receive any suitable data, to or from any other suitable system, in any suitable format, at any suitable time(s), in any suitable manner. For example, in some embodiments, the data can be sent in JavaScript Object Notation (JSON).

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, etc.), non-transitory forms of optical media (such as compact discs, digital video discs, Blu-ray discs, etc.), non-transitory forms of semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above-described steps of the processes of FIGS. 3-4 can be executed or performed in any order or sequence not limited to the order and sequence shown and described in the figures. Also, some of the above steps of the processes of FIGS. 3-4 can be executed or performed substantially simultaneously where appropriate or in parallel to reduce latency and processing times.

Figure 9:
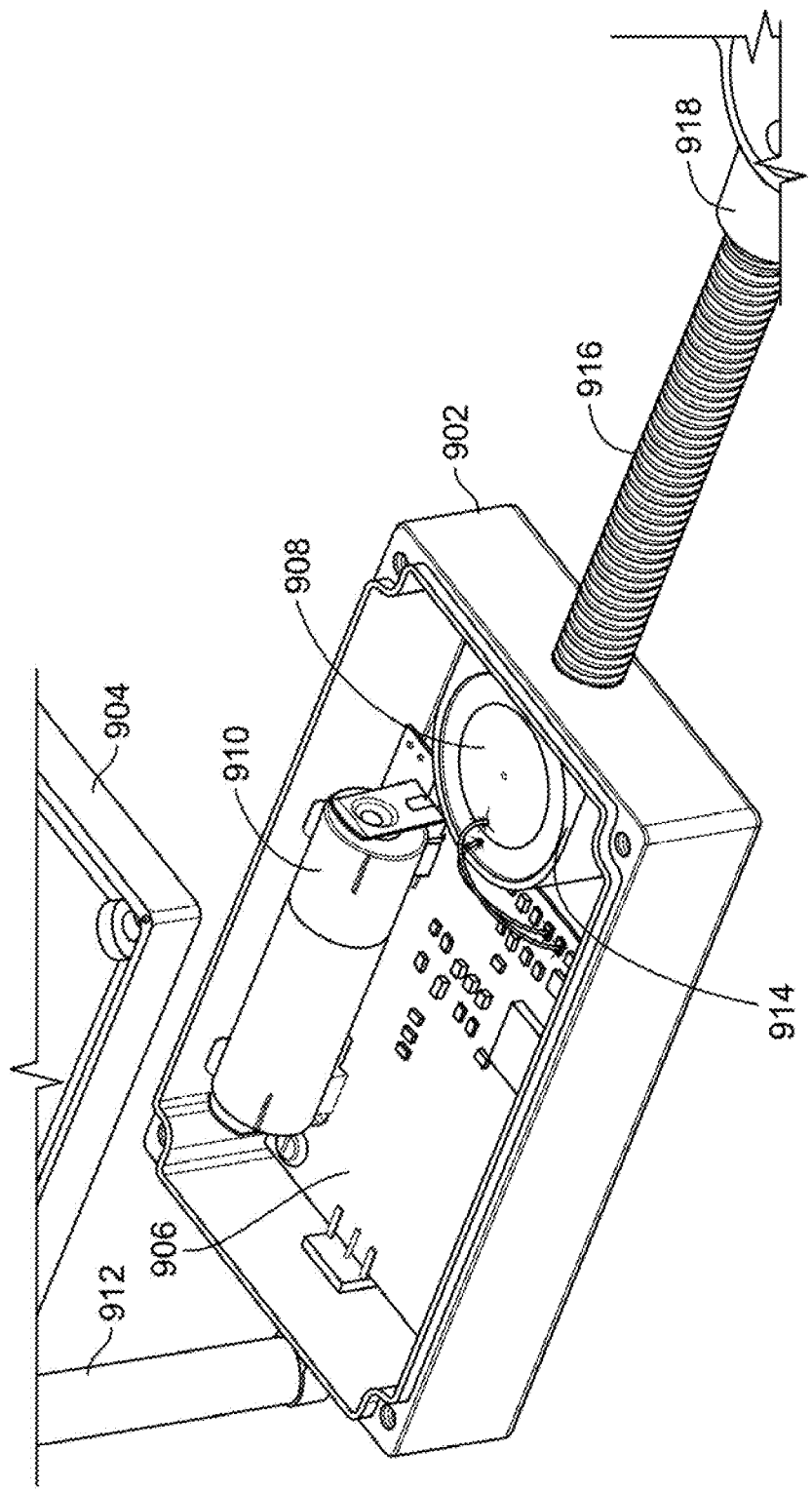
FIG. 9 is an illustration of an example of a layout of components in a sensor module in accordance with some embodiments.
Figure 10A:
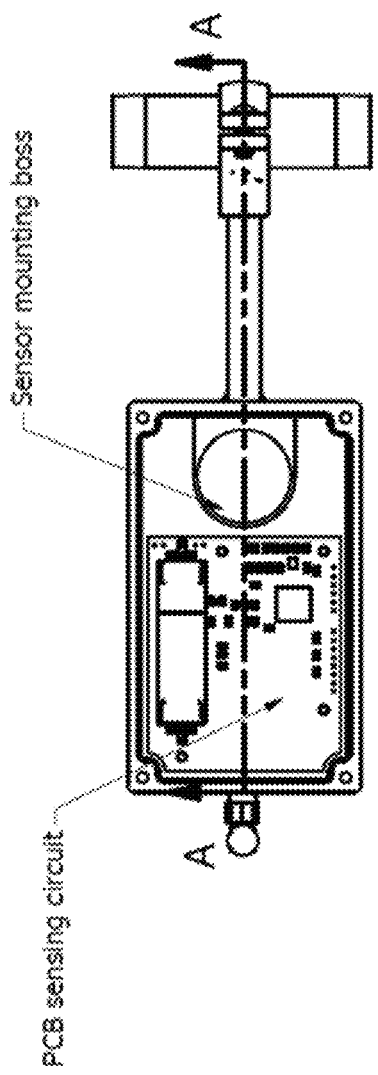
FIGS. 10A and 10B are illustrations of another example of a mechanism for coupling a sensor to a pipe in accordance with some embodiments.
Figure 10B:
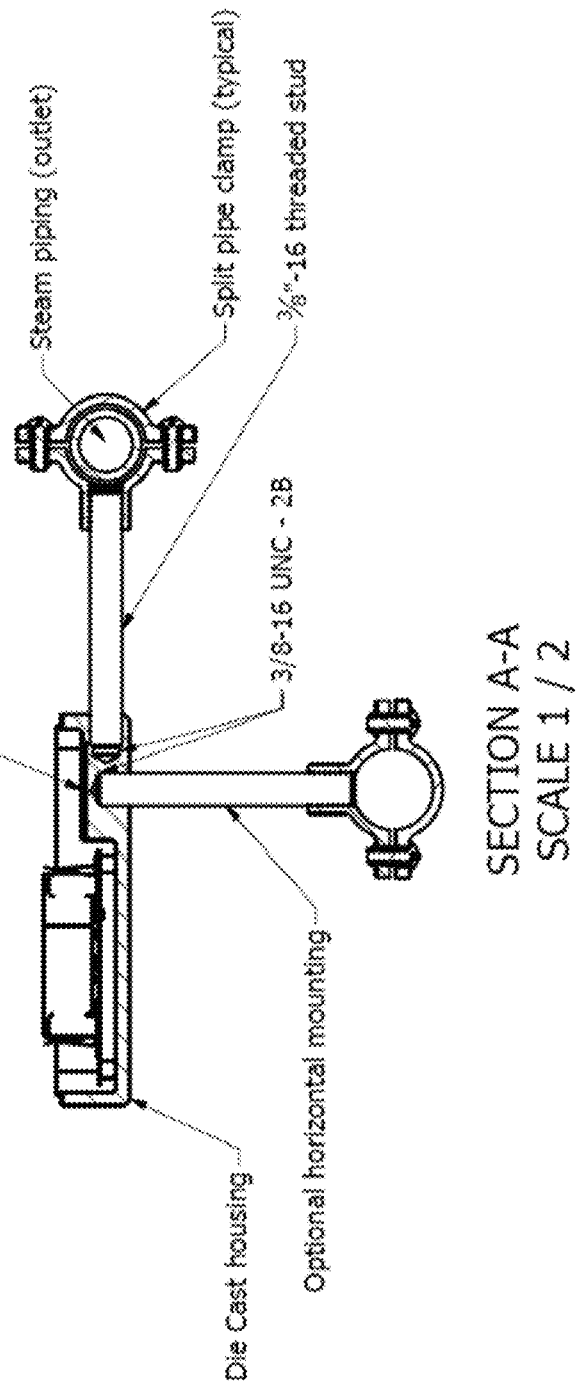
Figure 11:
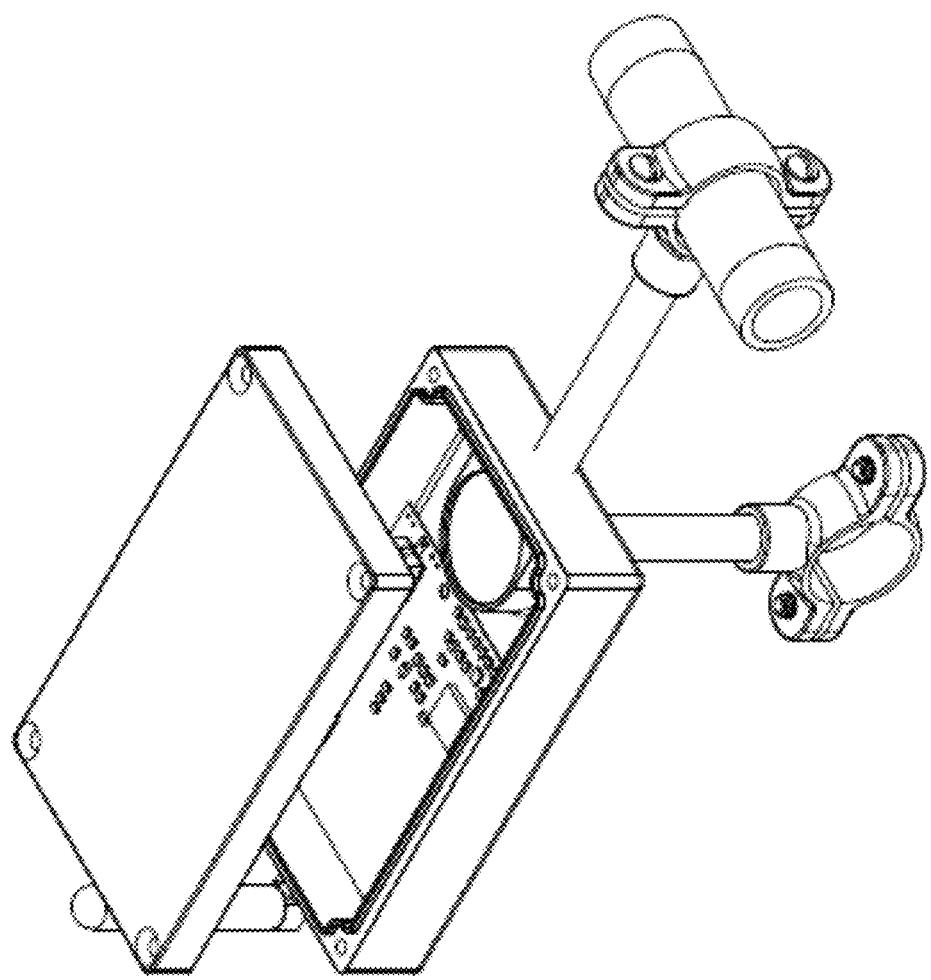
FIG. 11 is an illustration of still another example of a mechanism for coupling a sensor to a pipe in accordance with some embodiments.

Turning to FIGS. 9-11, illustrations of example housings and mounting hardware in accordance with some embodiments are illustrated. As shown in FIG. 9, in some embodiments, a housing can include a housing body 902 and a housing cover 904. The housing body can hold components of a sensor module, such as sensor module 200. These components can include a circuit board 906, a sensor 908, and a battery 910. An antenna 912 can be coupled to the circuit board and positioned outside the housing. The sensor can be mounted to a sensor mounting boss 914 in any suitable manner (e.g., using glue). The sensor mounting boss can be integrated with the housing body. For example, in some embodiments, the sensor body and the sensor mounting boss can be formed from a single piece of diecast aluminum. In some embodiments, any other suitable material can be used and the material can be formed into the sensor body and the sensor mounting boss in any suitable manner. A stud 916 can be screwed into the sensor platform and connected to a pipe clamp 918, which can be connected to a piece of equipment (e.g., a pipe of a steam trap).

FIGS. 10A, 10B, and 11 show alternate views of a housing and the components described in connection with FIG. 9 in accordance with some embodiments. In FIGS. 10B and 11, both a horizontal mounting arrangement (include stud and pipe clamp) and a vertical mounting arrangement (including stud and pipe clamp) are shown. In actual use, only one of these mounting arrangements is required.

In some embodiments, a silicone (or any other suitable material, e.g., rubber) seal can be provided between the housing body and the housing cover to keep moisture away from the components inside the housing. Likewise, the antenna may be coupled to the circuit board in a manner to provides a moisture tight seal.

Figure 12:
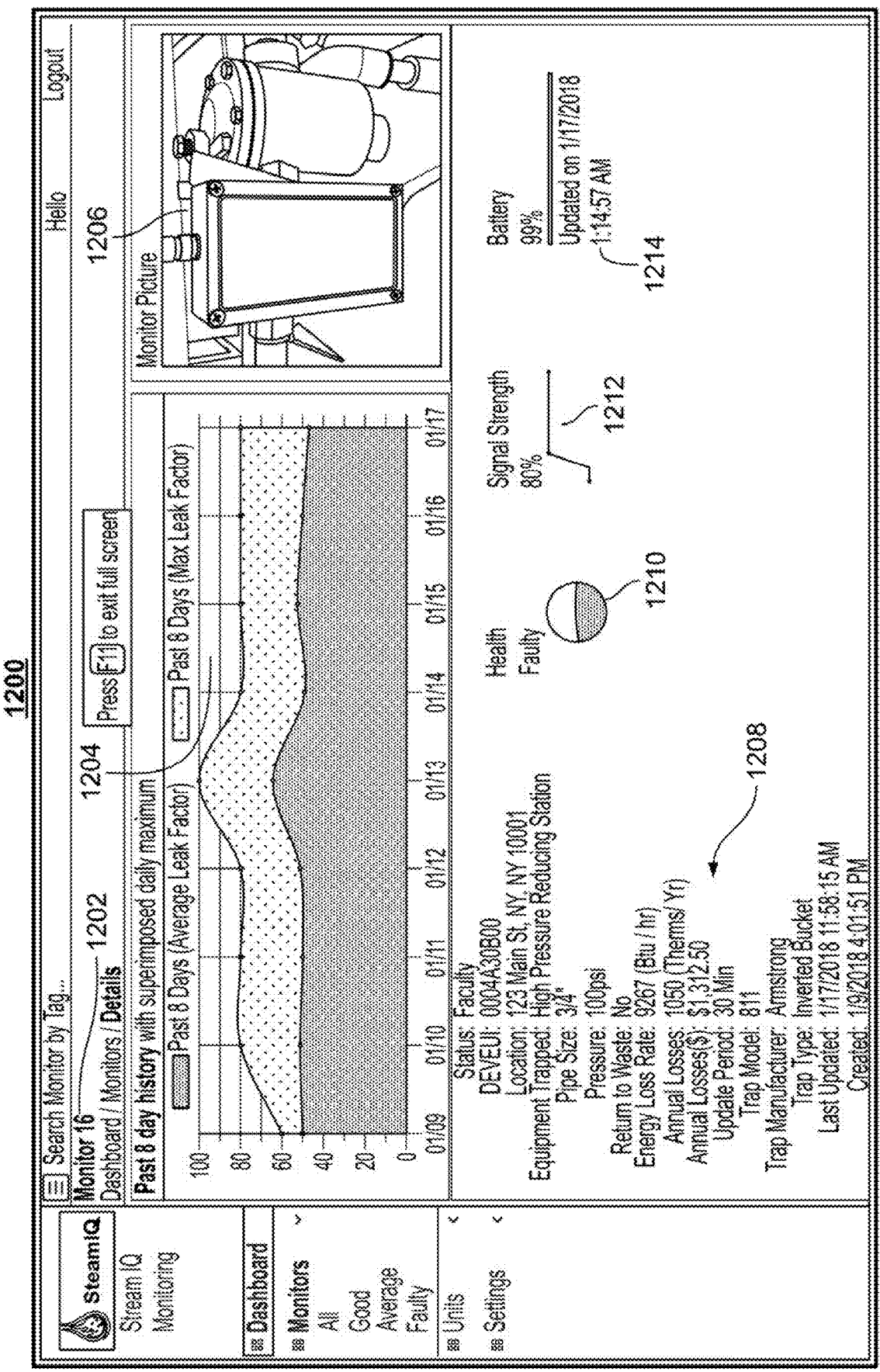
FIG. 12 is an illustration of an example of a user interface showing a graph of sensor measurements in accordance with some embodiments.

FIG. 12 shows an illustration of an example 1200 of a user interface showing a graph of sensor measurements in accordance with some embodiments. As shown, this interface is directed to monitoring steam traps, although this interface can be modified for any other suitable equipment. Interface 1200 shows an identifier (e.g., name) 1202 of a monitor (sensor module) for which information is presented, a graph 1204 showing intensity measurements over eight days (though any other suitable time period can additionally and/or alternatively be used), an image of the monitor 1206, information 1208 for a piece of equipment (e.g., a steam trap) being monitored by the monitor, a health status 1210 of the equipment (which shows the percentage of fault in the equipment), a signal strength 1212 of the monitor, and a battery level 1214 of the monitor. As shown in graph 1204, in an application with a steam trap, the graph can show an average leak factor and a maximum leak factor in some embodiments. In some embodiments, information 1208 can include any suitable information such as an identifier of a monitor, an identifier of a location of the monitor, an identifier of equipment being trapped, an identifier of a size of the pipe to which the monitor is attached, an identifier of a pressure value corresponding the pipe, an identifier of whether the pipe is a return to waste, an estimate of the current energy loss rate (e.g., in BTU/hour), an estimate of the annual loss in Therms (e.g., Therms/year), an estimate of the annual loss in dollars, how often the monitor updates its measurements, an identifier of model of the steam trap being monitored, an identifier of the make of the steam trap being monitored, an identifier of the type of the steam trap being monitored, when the last update was made, and when the record for the monitor was created, and/or any other suitable information.

Figure 13:
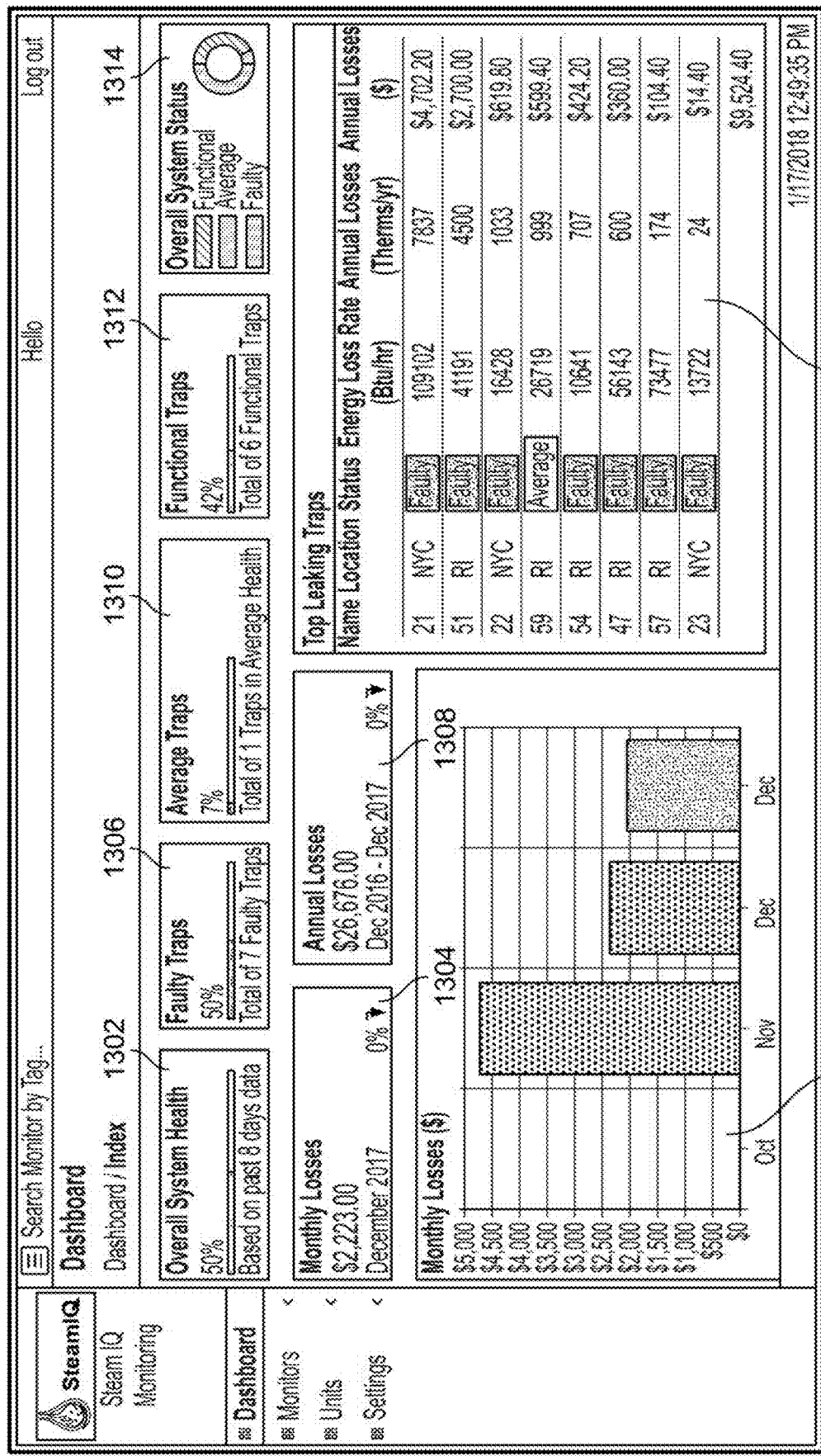
FIG. 13 is an illustration of an example of a user interface showing monetary losses in accordance with some embodiments.

FIG. 13 shows an illustration of an example 1300 of a user interface showing monetary losses in accordance with some embodiments. As shown, this interface is directed to monitoring steam traps, although this interface can be modified for any other suitable equipment. Interface 1300 includes an overall system health indicator 1302 that shows overall health of the steam traps being monitored in a given steam system, an indicator 1304 of the monthly losses in the system, indicators 1306 of the percentage and number of faulty traps in the steam system, an indicator 1308 of the annual losses in the system, indicators 1310 of the percentage and number of traps in the steam system having an average health, indicators 1312 of the percentage and number of traps in the steam system having a functional health, a donut graph 1314 showing the percentage of functional, average, and faulty traps being monitored, a bar graph 1316 showing monthly (or any other suitable time range) of losses, and a table 1318 showing top leaking steam traps indicating, for each trap, a name, a location, a status (average, faulty, etc.), an energy loss rate, annual losses in Therms per year, annual losses in dollars, and/or any other suitable information. Any other and/or alternative suitable information can be presented in interface 1300 in some embodiments.

In some embodiments, losses can be determined in any suitable manner. For example, in some embodiments, losses can be determined by first calculating the discharge steam loss rate (DSLR) using the following equation:

$$DSLR=47.12(\text{Orifice }Dia)^2(PSIG+14.7)^{0.97},$$

where:
"Orifice Dia" is the diameter of the pipe and "PSIG" is the pressure of the gas in the pipe.

Next, the energy loss rate (ELR) can be calculated using the following equation:

$$ELR=(DSLR)*(\text{Leak Factor})(\text{Pressure of saturated steam-Pressure saturated liquid})(\text{Discharge coefficient})(\text{Closed condensate return factor}),$$

where:
Leak Factor can be one of several values (e.g., 0% for fully plugged, 26% for leaking, and 55% for blowing by, and/or any other suitable values) or can be more precisely calculated based upon the amount of detected acoustic energy. For example, in some embodiments, when the acoustic energy is measured on a scale from 0 (no measured acoustic energy) to 7 (maximum measured acoustic energy), the Leak Factor can be calculated using the following equation:

$$\text{Leak Factor}=0.55*(\text{acoustic energy measurement}/7).$$

Pressure of saturated steam and pressure saturated liquid can be determined from commonly available steam tables.
Discharge coefficient can be 70% or any other suitable value.
Closed condensate return factor can be 36% or any other suitable value.

Then, the Therms lost per year (TLPY) can be calculated using the following equation:

$$TLPY=(\text{Hours of faulty operation})(ELR)/(\text{Boiler Thermal Efficiency \%})(\text{BTU to Therm}),$$

where:
Hours of faulty operation is the amount of time in the year that a faulty steam trap is operating.
Boiler Thermal Efficiency % can be 80% or any other suitable value.
BTU to Therm can be 0.00001 or any other suitable value.

Finally, Annual Losses can be calculated using the following equation:

$$\text{Annual Losses}=(TLPY)(\text{User \$/Therm}),$$

where User $/Therm is the amount of money that a user pays for Therms.

Figure 14:
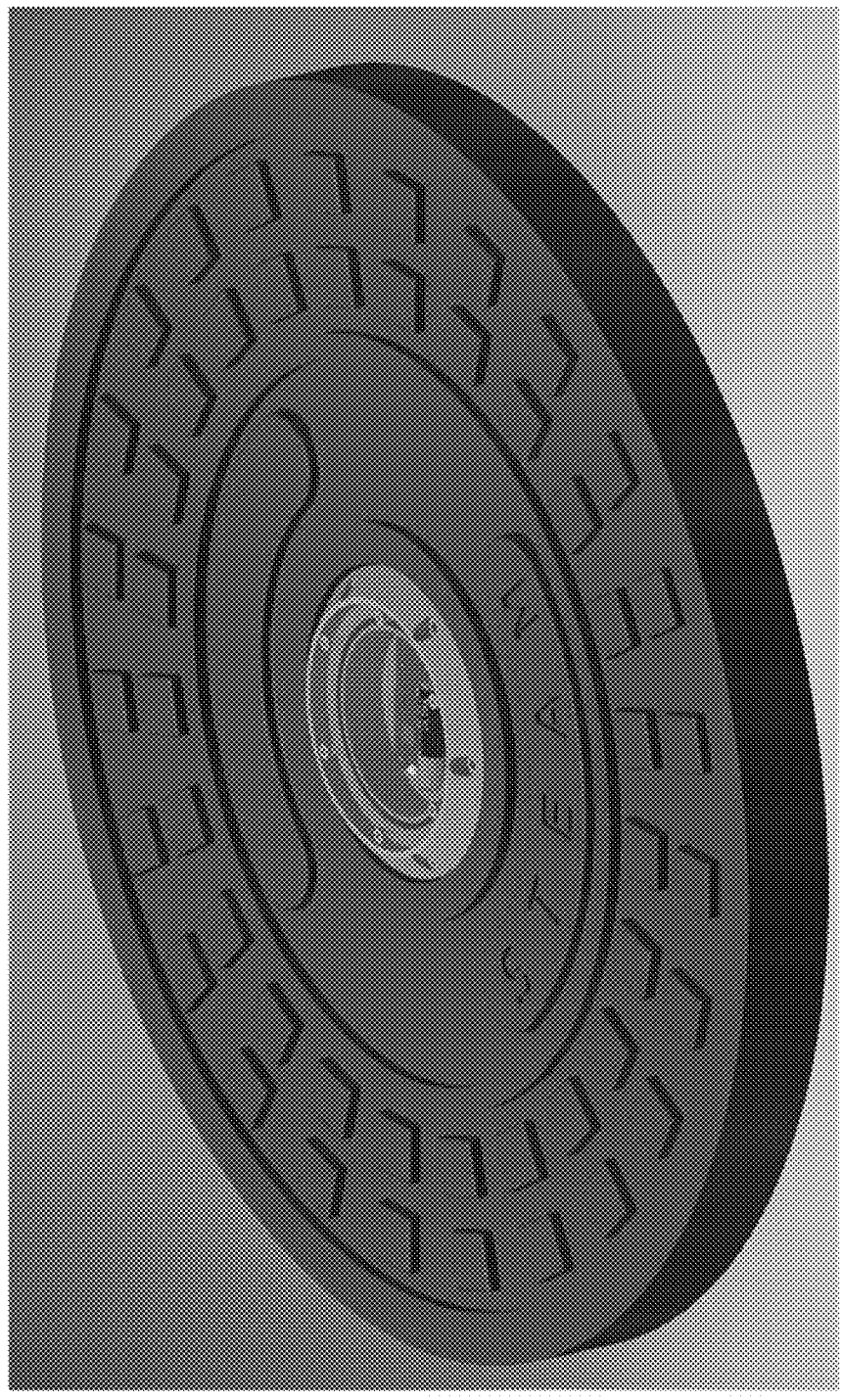
FIG. 14 is an illustration of an example in which certain portions of the mechanisms described herein are incorporated into a manhole cover in accordance with some embodiments.

Although examples are provided above in which all components of a sensor module are implemented adjacent to a steam trap or steam pipe being monitored, in some embodiments, some portions of a module may be located separately from other portions of a module. For example, as illustrated in FIG. 14, in some embodiments, some portions of a sensor module may be mounted outside of a region in which a steam trap or steam pipe being monitored is located. More particularly, for example, components 204, 206, 208, 210, and 212 of FIG. 2 may be located on the top side of a manhole cover. Sufficiently long wires connecting component 204 to a sensor 202 can then be provided so that the sensor can be mounted to a steam trap and/or steam pipe as described herein. This can protect sensitive portions of components 204, 206, 208, 210, and/or 212 from being exposed to a hostile environment that sensor 202 can tolerate. In some embodiments, a temperature sensor may also be mounted near sensor 202 and connected to other components of a sensor module 202 so that temperature can be monitored. To facilitate such an arrangement, component 202 may be any suitable sensor for tolerating a given environment, such as a high temperature piezo bender, and any suitable wires (such as high temperature wires with shielding, jacketing, and/or conduit) may be provided. When components of sensor module 200 are mounted on the top surface (or within) a manhole cover, the components may be suitably protected from vehicles using any suitable casing, such as a strong plastic casing that allows radio waves from antenna 212 to pass through the casing. Although some portions of a sensor module be located separately from other portions of a module is illustrated herein in the context of a manhole cover, it should be apparent that other implementations are also possible. For example, some portions may be located separately because a given environment in which a sensor needs to be located is too hostile (due to temperature, humidity, vibration, chemicals, etc.) for the portions, because the environment will not allow transmissions from the sensor to pass beyond a wall of the environment (e.g., when the environment is underground, surrounded by metal, etc.), or for any other purpose.

In some embodiments, the mechanisms described herein can be used with cyclical steam traps, such as inverted bucket steam traps, thermodynamic steam traps, thermostatic steam traps, and/or any other suitable cyclical steam traps. Such steam traps can be characterized by a behavior in which the steam traps cycle through periods of discharge and no-discharge in some embodiments. During such cycling, the steam traps can emit elevated levels of energy (e.g., ultrasonic energy, audible energy, etc.) when discharging and can emit reduced levels of energy when not discharging, in some embodiments. Cycling can be determined by detecting emitted energy levels from a trap going above an upper threshold and dropping below a lower threshold, which thresholds can be static (e.g., a fixed upper threshold and a fixed lower threshold) or dynamic (e.g., an upper threshold based on the average energy level plus a measured variance minus 20 dB and a lower threshold based on the average energy level minus a measured variance plus 20 dB). These emissions during cycling can approximate a square wave in some embodiments. Such steam traps can cycle with a frequency less than one time per minute to over ten times per minute in some embodiments. To monitor the operation of such a cyclical steam trap in some embodiments, a sensor module can be configured to sample the energy (e.g., ultrasonic energy, audible energy, etc.) output by the steam traps. Each sample can be made in any suitable manner, such as the manner described above. In some embodiments, the sensor module can sample the energy of a trap for 60 ms (or any suitable other duration), every two (or any suitable other number) seconds, over a window of one (or any suitable other number) minute, every 30 (or any suitable other number) minutes. Thus, in the course of one hour, the monitor can perform 30 samples during a first one-minute window and then perform 30 more samples during a second one-minute window approximately 30 minutes later. In some embodiments, the sensor module can sample the energy of a trap for 60 ms (or any suitable other duration), every two (or any suitable other number) seconds, over a window of one (or any suitable other number) minute, every 60 (or any suitable other number) minutes. Thus, in the course of one hour, the monitor can perform 30 samples during a first one-minute window and then wait for 59 minutes until sampling again.

By sampling the energy in this manner, an approximate waveform of the steam trap's operation can be formed in some embodiments. From this, a cycle count of the operation of the steam trap, a frequency of operation of the steam trap, a duty cycle of operation of the steam trap, and a condensate loading can be determined in some embodiments.

In some embodiments, any suitable alerts/alarms can be triggered based on this information. For example, in some embodiments, an alert/alarm can be triggered when the difference between the energy sampled during a suspected discharge period and the energy sampled during a suspected non-discharge period is too similar (in other words, square wave amplitude is too small). As another example, in some embodiments, an alert/alarm can be triggered when it is determined that a steam trap has exhibited a rapid increase in cycle counts and followed by a cessation of cycling to warn a user of a possible steam trap overwhelmed with condensate and possible water hammer event. As another example, in some embodiments, an alert/alarm can be triggered when a cyclic steam has stopped cycling and is relatively cold (e.g., relative to steam temperatures).

In some embodiments, monitoring for cycling in a cyclical steam trap can be remotely activated in a sensor module on demand, and any suitable parameters of such monitoring can be remotely programmed.

Figure 16:
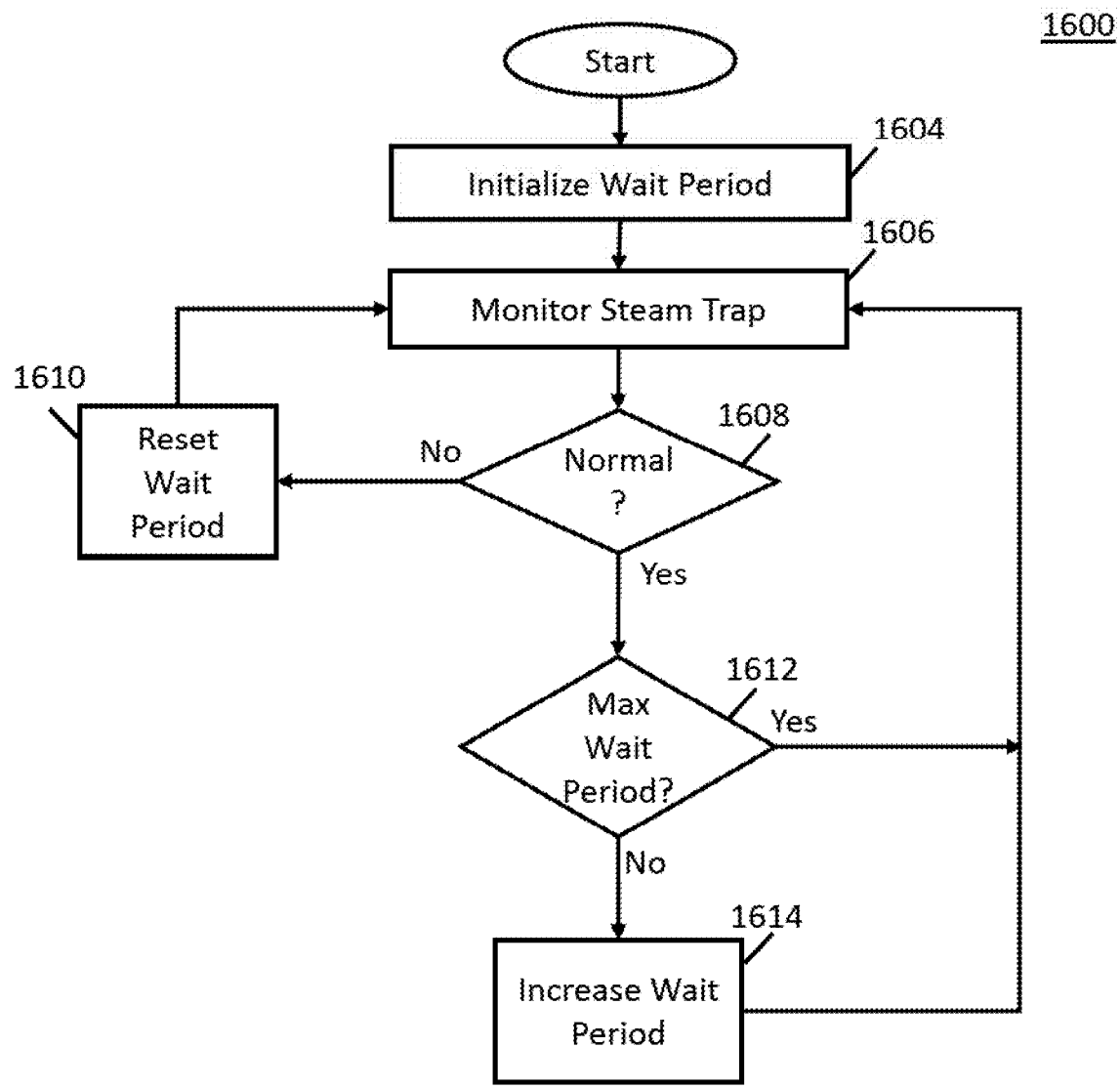
FIG. 16 is an example of a process for conserving battery power in accordance with some embodiments.

In some embodiment, to conserve battery power, a sensor module can automatically reduce the number of samples made during periods when normal activity of a steam trap is detected. An example of such a process 1600 in accordance with some embodiments is shown in FIG. 16.

For example, each time a sensor module detects normal activity during a monitoring window (e.g., at 1606 and 1608 of FIG. 16), the monitor can increase by one (or any other suitable number) (e.g., at 1614 of FIG. 16) a count (which is initialized to zero before monitoring (e.g., at 1604 of FIG. 16)) of the number of subsequent monitoring windows to skip before monitoring will take place again. If the sensor module detects abnormal activity, the sensor module can set the count to zero (or any other suitable number) (e.g., at 1610 of FIG. 16).

So, as a more particular example, when monitoring a cyclical steam trap, after an initial one-minute monitoring window of normal activity, the count can be set to one (or any other suitable number). This would cause the monitor to skip the next window thirty minutes later and then monitor during the subsequent window sixty minutes later. If normal activity is again detected, this would cause the count to increase and the monitor to skip the next two windows at thirty and sixty minutes later and then monitor during the subsequent window at ninety minutes later. If normal activity is again detected, this would cause the count to increase and the monitor to skip the next three windows at thirty, sixty, and ninety minutes later and then monitor during the subsequent window at 120 minutes later. This process could continue for up to any suitable number of skipped monitoring windows in some embodiments. In some embodiments, the count may be restricted from going above ten (or any other suitable number) skipped windows (e.g., at 1612 of FIG. 16). If at any time during monitoring, the sensor detects abnormal activity, the sensor module could reset the count to zero (or any other suitable number).

As another more particular example, when monitoring a non-cyclical steam trap, after an initial 60 ms monitoring window of normal activity, the count can be set to one (or any other suitable number). This would cause the monitor to skip the next window one minute later and then monitor during the subsequent window two minutes later. If normal activity is again detected, this would cause the count to increase and the monitor to skip the next two windows at one and two minutes later and then monitor during the subsequent window at three minutes later. If normal activity is again detected, this would cause the count to increase and the monitor to skip the next three windows at one, two, and three minutes later and then monitor during the subsequent window at four minutes later. This process could continue for up to any suitable number of skipped monitoring windows in some embodiments. In some embodiments, the count may be restricted from going above ten (or any other suitable number) skipped windows. If at any time during monitoring, the sensor detects abnormal activity, the sensor module could reset the count to zero (or any other suitable number).

Figure 15:
FIG. 15 is an illustration of an example of a user interface showing monitoring of a cyclical steam trap in accordance with some embodiments.

Turning to FIG. 15, an illustration of a user interface that can be presented to a user on a user device is shown in accordance with some embodiments. As shown, in some embodiments, the user interface can show average leak factor, average temperature, average cycle counts and/or any other suitable data. Average leak factor can be determined in any suitable manner, such as by averaging readings taken over a given period of time. This particular interface shows an example of normal cyclical counts of a steam trap, from December 23 through December 28, followed by a period of leaking from December 28 through January 24, followed by normal activity from January 24 through January 29. This reflects that the steam trap had failed at the beginning of the period of leaking and was replaced or repaired on January 24.

In some embodiments, an accelerometer can be included in the sensor module. Any suitable accelerometer, such as part number ISM330DLCTR or part number IIS2DLPC available from STMicroelectronics of Geneva Switzerland, can be used in some embodiments. The accelerometer can be coupled to a suitable amplifier and threshold detector to detect any suitable vibration event, such as a water hammer event, at steam trap or pipe being measured and cause an alert/alarm to be generated for a user. In some embodiments, the output of the amplifier (that is coupled to the output of the accelerometer) can be coupled to an input of analog-to-digital converter that is coupled to the hardware processor of the sensor module. In this way, the hardware processor can receive acceleration data from the accelerometer.

In some embodiments, an accelerometer can be used to monitor cycling of steam traps. Similarly to what is described above for ultrasonic monitoring, by sampling the energy using an accelerometer, an approximate waveform of the steam trap's operation can be formed in some embodiments. From this, a cycle count of the operation of the steam trap, a frequency of operation of the steam trap, a duty cycle of operation of the steam trap, and a condensate loading can be determined in some embodiments.

In some embodiments, any suitable alerts/alarms can be triggered based on this information. For example, in some embodiments, an alert/alarm can be triggered when the difference between the energy sampled during a suspected discharge period and the energy sampled during a suspected non-discharge period is too similar (in other words, square wave amplitude is too small). As another example, in some embodiments, an alert/alarm can be triggered when it is determined that a steam trap has exhibited a rapid increase in cycle counts and followed by a cessation of cycling to warn a user of a possible steam trap overwhelmed with condensate and possible water hammer event. As another example, in some embodiments, an alert/alarm can be triggered when a cyclic steam has stopped cycling and is relatively cold (e.g., relative to steam temperatures).

In some embodiments, one or more accelerometers can be used in conjunction with one or more other sensors (ultrasonic sensors, temperature sensors, and/or any other sensors) to perform monitoring.

For example, in some embodiments, an accelerometer, an ultrasonic sensor, and a temperature sensor can be used to detect a failed closed steam trap by detecting no accelerations (or vibrations) in the steam trap, detecting decreased ultrasonic noise, and detecting a drop in temperature of the steam trap. For example, if a monitor was reporting 35 degree C. historical temperatures and the temperature dropped to 15 degree C. and there were no leaks or cycles and an accelerometer was not detecting any activity, the hardware processor could be configured to report that the steam may be off or that the steam trap is failed closed.

In some embodiments, an accelerometer in a sensor module can have any suitable sampling rates. For example, in some embodiments, an accelerometer can sample at rates from 1.6 Hz to 1600 Hz. In some embodiments, an accelerometer can be configured to sample at one rate (e.g., a low frequency and/or low power rate) and wake the hardware processor when an event is detected. More particularly, for example, in some embodiments, an accelerometer can be configured to sample at 8 Hz in a low-resolution mode to maximize battery life. If the accelerometer detected certain accelerator or vibration thresholds, it can wake up the hardware processor, which can cause the accelerometer to switch to higher sampling frequency (e.g., 800 Hz) for more resolution. The hardware processor can then process the sampled data and send an alert if the sampled data suggest that there was an anomaly (e.g., such as a water hammer event).

Figure 17:
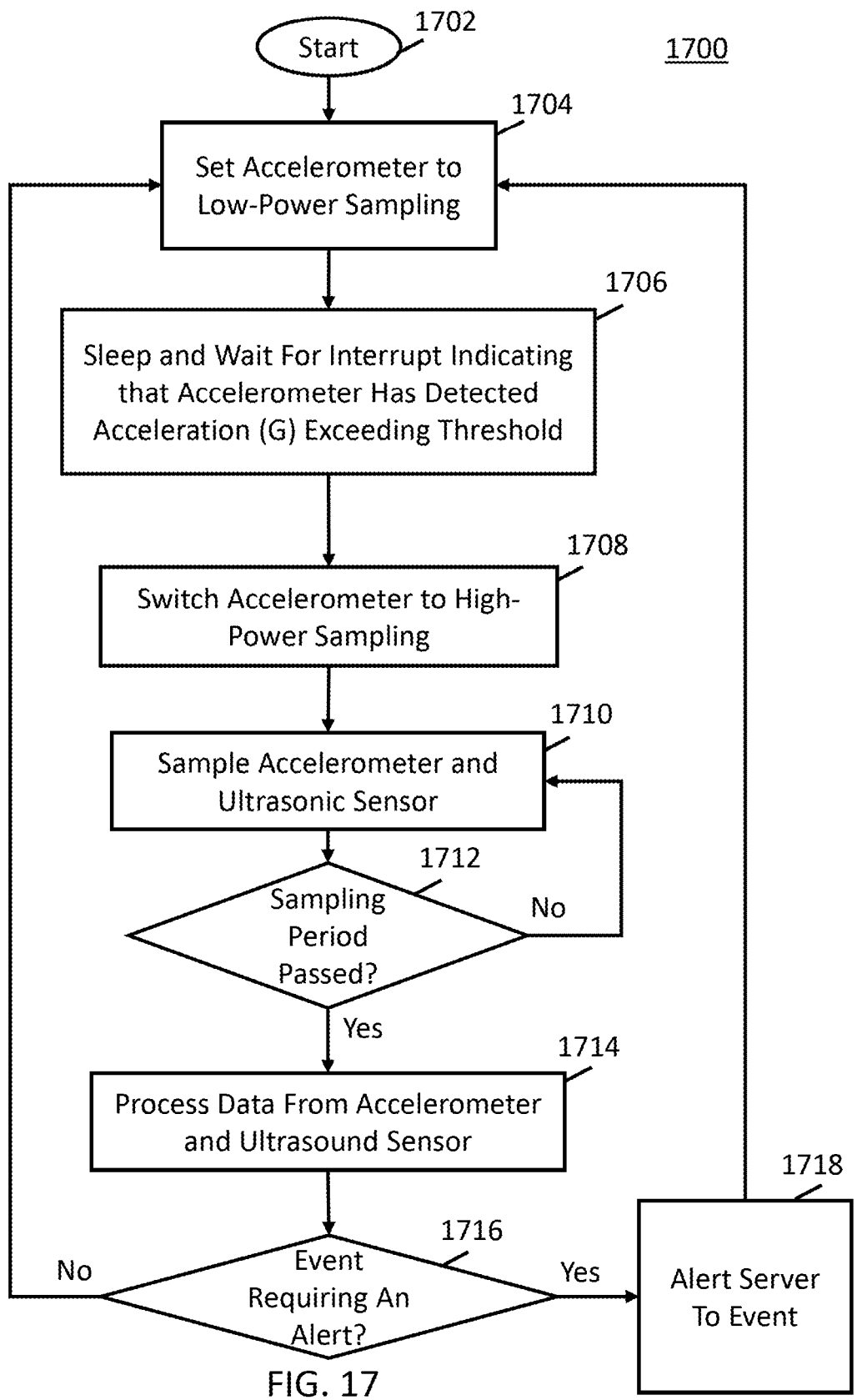
FIG. 17 is an example of a process for switching between low-power accelerometer sensing and high-power accelerometer sensing, and for combined sensing with an accelerometer and an ultrasonic sensor to detect certain events in accordance with some embodiments.
Figure 18:
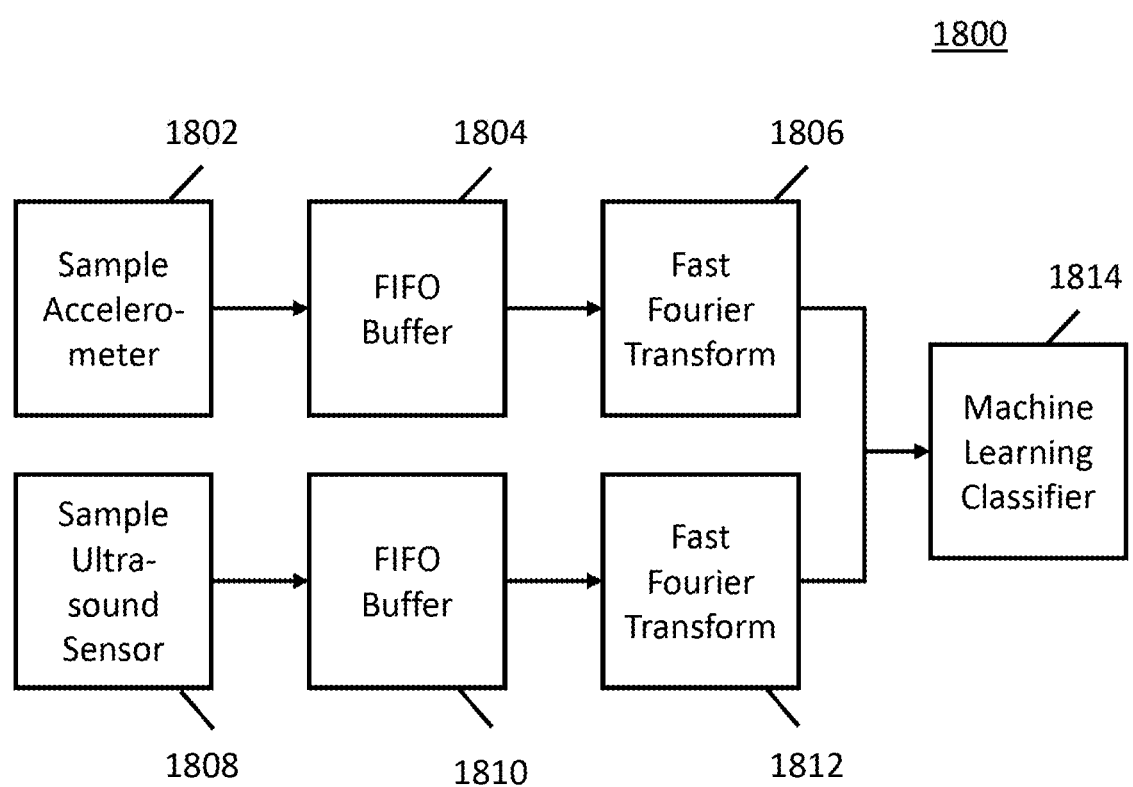
FIG. 18 is an example of a process for combined sensing with an accelerometer and an ultrasonic sensor to detect certain events in accordance with some embodiments.

FIGS. 17 and 18 illustrate examples 1700 and 1800 of processes for switching between low-power accelerometer sensing and high-power accelerometer sensing, and for combined sensing with an accelerometer and an ultrasonic sensor to detect certain events (such as a water hammer event, a valve closing, an expansion in a pipe installation, steam trap cycling, etc.), in accordance with some embodiments. These processes can be executed by a hardware processor of a sensor module in some embodiments.

As shown, after process 1700 begins at 1702, the process can set an accelerometer to a low-power-sampling mode. The accelerometer can be configured to have any suitable settings that result in reduced power usage in the low-power-sampling mode in some embodiments. For example, in some embodiments, the accelerometer can be configured to sample at a reduced frequency compared to other operating modes, such as to sample at 10 Hz (or any other suitable frequency), with reduced accuracy (e.g., 12 bits for a range of 0 to 2 G, wherein the LSB=488 μG).

Next, at 1706, the hardware processor can enter a sleep mode and wait for an interrupt indicating that the accelerometer has detected an acceleration (G) exceeding a threshold. The sleep mode can be any suitable mode in which the hardware processor reduces its power consumption. The interrupt can be generated in any suitable manner such as using a threshold detector to detect a suitably high acceleration on one or more axes of the accelerometer.

Then, at 1708, process 1700 can switch the accelerometer to a high-power sampling mode. The accelerometer can be configured to have any suitable settings in the high-power-sampling mode in some embodiments. For example, in some embodiments, the accelerometer can be configured to sample at an increased frequency compared to low-power mode, such as to sample at 1.6 kHz (or any other suitable frequency), with increased accuracy compared to low-power mode (e.g., 14 bits for a range of 0 to 2 G, wherein the LSB=122 μG).

At 1710, process 1700 can sample the accelerometer and an ultrasonic sensor (such a Piezo sensor) and store the resulting data. This sampling is also illustrated in 1802 and 1808 of FIG. 8 and this storing is also illustrated in 1804 and 1810 of FIG. 8.

The sampling at 1710, 1802, and 1808 can be performed in any suitable manner in some embodiments. For example, in some embodiments, the process can sample the accelerometer by causing an analog-to-digital converter coupled to the accelerometer by an amplifier to sample an analog output of the amplifier and produce a digital output corresponding to the analog output that is received by the hardware processor. Likewise, for example, in some embodiments, the process can sample the ultrasonic sensor by causing an analog-to-digital converter coupled to the ultrasonic sensor by an amplifier to sample an analog output of the amplifier and produce a digital output corresponding to the analog output that is received by the hardware processor. The accelerometer and the ultrasound sensor can be sampled at any suitable frequencies in some embodiments. For example, in some embodiments, the accelerometer and the ultrasound sensor can be sampled at 1.6 kHz and 1 MHz, respectively.

The storing at 1710, 1804, and 1810 can be performed at in any suitable manner. For example, in some embodiments, the samples can be stored in first-in, first-out (FIFO) buffers, which can be part of, or separate from, the hardware processor.

Process 1700 can continue sampling the accelerometer and the ultrasound sensor and store the results until it is determined at 1712 that a sampling period has passed. Any suitable sampling period, such as two seconds, can be used in some embodiments.

After the sampling period has passed, at 1714, the hardware processor can process the data based on the outputs of the accelerometer and the ultrasonic sensor. This data can be processed in any suitable manner.

For example, in some embodiments, as shown in 1806 and 1812 of FIG. 18, this data from each of the accelerometer and the ultrasonic sensor can first be processed by a corresponding Fast Fourier Transform (FFT).

The FFT at 1806 can be performed in any suitable manner. For example, in some embodiments, the FFT can be performed with 128 bins over a frequency range from 0 hz to 3.2 kHz. The results of the FFT at 1806 can then be provided to a machine learning classifier at 1814.

The FFT at 1812 can be performed in any suitable manner. For example, in some embodiments, the FFT can be performed with 128 bins over a frequency range from 0 Hz to 100 kHz. The results of the FFT at 1812 can then be provided to the machine learning classifier at 1814.

After performing the FFT operations at 1806 and 1812, the resulting data can be provided to any suitable machine learning classifier (as shown by 1814 of FIG. 18) (such as a neural network, a support vector machine, a Naive Bayes algorithm) that has been trained to detect events such as water hammer events, a valve closing, an expansion in a pipe installation, and/or any other suitable event. For example, in some embodiments, a trained neural network can be used to indicate the likelihood that any suitable event type(s) (e.g., such as a water hammer event) has(have) occurred. In such an example, a neural network can be trained using data from events of known event types.

In some embodiments, the machine learning classifier (e.g., neural network) can be updated and/or retrained from time to time. For example, in some embodiments, feedback from a technician can be used to validate whether an event was in fact of the determined event type and this feedback along with the data previously input to the machine learning classifier for the event can be used to update the machine learning classifier as either a positive training sample or a negative training sample.

Next, at 1716, based on the results of the processing at 1714, process 1700 can determine if an event requiring an alert (e.g., a water hammer event, a valve closing, an expansion in a pipe installation, etc.) has been detected at 1714. If such an event has been detected, process 1700 can branch to 1718 at which it can send an alert to a server notifying the server of the event and providing any suitable data regarding the event, such as an identifier of the sensor module, a location of the sensor module, a time of the event, and data regarding the event (e.g., maximum and/or average acceleration G-force values observed on each axis of the accelerometer, maximum and/or average energy recorded through the ultrasound sensor in any suitable number (e.g., four) of frequency bands in any suitable range (e.g., from 25 kHz to 45 kHz), an indicator of the type of event detected, a confidence score that the indicated even type occurred, etc.). Otherwise, if such an even has not been detected, process 1700 can loop back to 1704.

In some embodiments, the location of a water hammer event can be determined and presented to a user on a user interface by comparing the amplitudes of acceleration measurements over multiple steam trap sensor modules. For example, since it is known where the steam trap sensor modules are located, if a large water hammer event were to trigger an alert on X monitors, acceleration measures from those X monitors could be compared to detect a subset with the highest measurements to roughly determine the foci of the water hammer event. This foci could then be presented to a user via an suitable user interface so that corrective action can be taken before a failure occurs.

Figure 19:
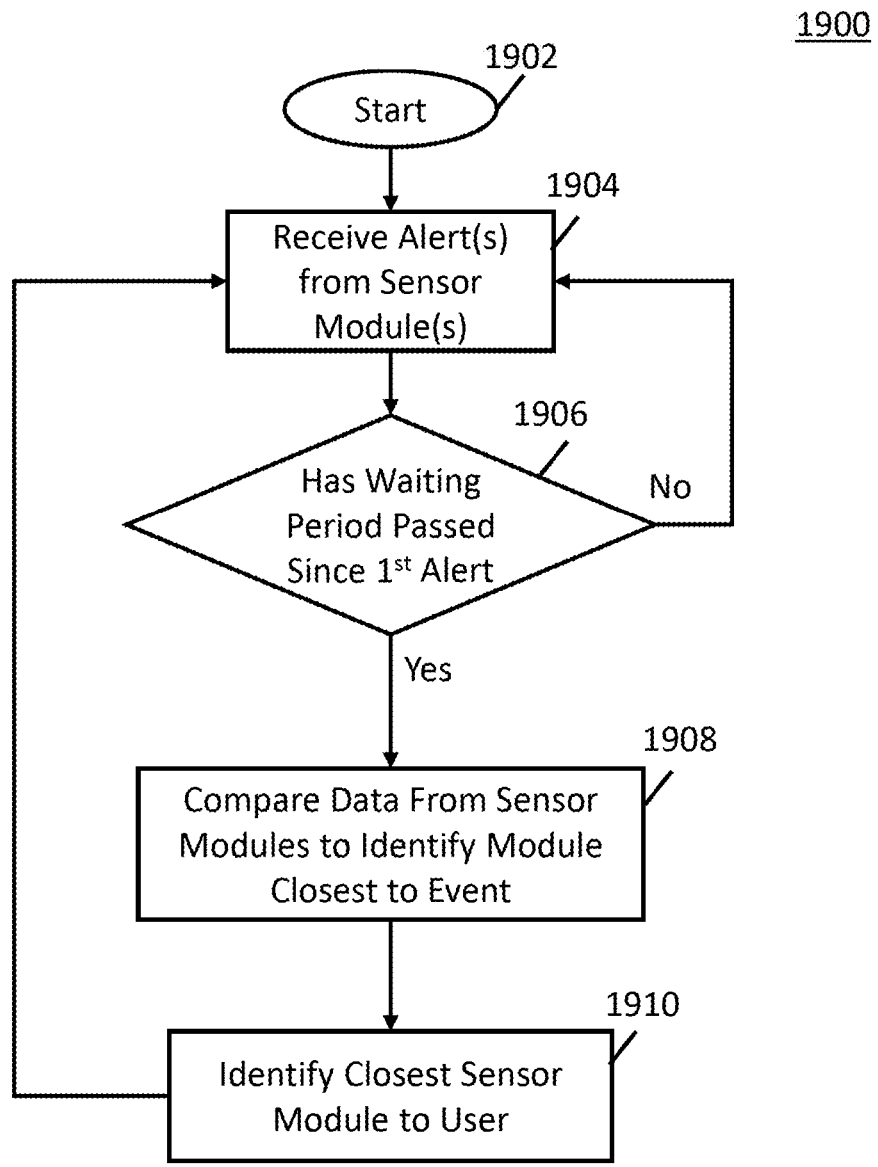
FIG. 19 is an example of a process for identifying a sensor module closest to an event in accordance with some embodiments.

Turning to FIG. 19, an example 1900 of a process for identifying a sensor module closest to an event in accordance with some embodiments is illustrated. This process can be executed by a hardware processor of a server in communication with multiple sensor modules.

As shown, after the process begins at 1902, the process can receive at 1904 one or more alerts of an event from one or more sensor modules. As mentioned above in connection with 1718 of FIG. 17, if a water hammer event is detected, a hardware processor of a sensor module can transmit a message to inform a server that it has detected a water hammer event. Within this message, the hardware processor can also transmit: maximum and/or average acceleration G-force values observed on each axis of the accelerometer, maximum and/or average energy recorded through the ultrasound sensor in any suitable number (e.g., four) of frequency bands in any suitable range (e.g., from 25 kHz to 45 kHz), an indicator of the type of event detected, a confidence score that the indicated even type occurred, etc.

Next, at 1906, the process can wait for a given period of time since the first alert was received to pass. Any suitable period of time (e.g., ten seconds) to pass can be used in some embodiments. If the given period of time has not passed, process 1900 can loop back to 1904 to receive more alerts.

Otherwise, once the given period of time has passed, process 1900 can branch to 1908 at which the process can compare any suitable parameters (e.g., such as maximum and/or average acceleration G-force values observed on each axis of the accelerometer, maximum and/or average energy recorded through the ultrasound sensor in any suitable number (e.g., four) of frequency bands in any suitable range (e.g., from 25 kHz to 45 kHz), a confidence score that the indicated even type occurred, etc.) of the event detections from each sensor module and identify a sensor module closest to where the water hammer evet occurred.

Finally, at 1910, process 1900 can identify the closest sensor to the water hammer event to a steam trap technician. This identification can occur in any suitable manner. For example, a short-messaging-service (SMS) message can be sent to a mobile phone of the technician with a sensor module number, a sensor module location name, a sensor module latitude and longitude, etc. As another example, the same information can be sent in an email or be presented on a user interface used by the technician. This identification can assist the steam trap technician in identifying on which trap the water hammer event occurred thereby finding the root cause of the water hammer event in a faster manner.

In some embodiments, when suitable data describing the layout, materials, and/or other characteristics of a steam system is accessible, a hardware processor in communication with multiple sensor modules can provide more specific information on detected events. For example, based on data received from multiple sensor modules as well as data about steam piping, a hardware processor can be configured to model the propagation of a water hammer shock wave through the steam piping and thereby determine a location in the steam piping at which the water hammer event originated. The modeling may take into account dampening of the shock wave caused by the materials used in the piping, the physical characteristics (e.g., length, diameter, wall thickness, etc.) of different segments of the piping, turns and/or corners in the piping, valves, splits, and/or any other suitable characteristics of the piping. In some embodiments, a machine learning classifier can be trained to identify locations in a steam pipe system through a training procedure in which a technician bangs on steam pipes in certain known locations and the machine learning classifier receives inputs from multiple sensor modules in the system. Any suitable number of training samples from each location and any suitable number of different locations can be used in some embodiments.

It should also be noted that, as used herein, the term mechanism can encompass hardware, software, firmware, or any suitable combination thereof.

Although the invention has been described in the context of monitoring steam traps, it should be apparent that the mechanisms described herein can be used for other purposes without departing from the spirit and scope of the invention. For example, in some embodiments, the mechanisms can be used to detect leaking gas in a gas system (such as a natural gas system, an ammonia gas system, a nitrogen gas system, a hydrogen gas system, and/or any other suitable gas system). As another example, in some embodiments, the mechanisms can be used to determine that a bearing or other mechanical device that is subject to wear failure is failing. As yet another example, in some embodiments, the mechanisms can be used to determine that a valve (such as a water valve or air valve) is failing.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A system for generating an alert of an event in a steam pipe, comprising:
   a memory;
   a first hardware processor that is coupled to the memory and that is configured to at least:
      obtain temperature measurements of the steam trap;
      sample an accelerometer coupled to a steam pipe to provide accelerometer data;
      determine that the accelerometer data meets or exceeds a threshold;
      in response to the determining that the accelerometer data meets or exceeds the threshold:
         increase the sample frequency at which the accelerometer is sampled; and
         sample an ultrasonic sensor to provide ultrasonic sensor data;
      detect a failed closed steam trap by detecting no accelerations in the steam trap, detecting decreased ultrasonic noise based on the ultrasonic sensor data, and detecting a drop in temperature of the steam trap; and
      generate an alert of the failed closed steam trap; and
   a second hardware processor that is configured to at least:
      receive a plurality of alerts that a water hammer event has occurred;
      determine that a period of time has passed since a first of the plurality of alerts was received; and
      in response to determining that the period of time has passed, compare data from multiple sensor modules to identify one of the multiple sensor modules that is closest to the water hammer event.

2. The system of claim 1, wherein the sampling of the accelerometer is performed for a given period of time, and wherein the sampling of the ultrasonic sensor is performed for the given period of time.

3. The system of claim 2, wherein the hardware processor is further configured to perform a Fast Fourier Transform (FFT) operation on the accelerometer data to produce first FFT output data and perform a FFT operation on the ultrasonic sensor data to produce second FFT output data, and wherein the generating the alert is based at least in part on the first FFT output data and the second FFT output data.

4. The system of claim 3, wherein the hardware processor is further configured to use a machine learning classifier to indicate a likelihood that a water hammer event occurred and wherein the generating the alert is based at least in part an output of the machine learning classifier.

5. The system of claim 4, wherein the machine learning classifier is a neural network.

6. A method of generating an alert of an event in a steam pipe, comprising:
   obtaining temperature measurements of the steam trap;
   sampling an accelerometer coupled to a steam pipe to provide accelerometer data;
   determining that the accelerometer data meets or exceeds a threshold using a hardware processor;
   in response to the determining that the accelerometer data meets or exceeds the threshold:
      increasing the sample frequency at which the accelerometer is sampled; and
      sampling an ultrasonic sensor to provide ultrasonic sensor data;
   detecting a failed closed steam trap by detecting no accelerations in the steam trap, detecting decreased ultrasonic noise based on the ultrasonic sensor data, and detecting a drop in temperature of the steam trap;
   generating an alert that of the failed closed steam trap;
   receiving a plurality of alerts that a water hammer event has occurred;
   determining that a period of time has passed since a first of the plurality of alerts was received; and
   in response to determining that the period of time has passed, comparing data from multiple sensor modules to identify one of the multiple sensor modules that is closest to the water hammer event.

7. The method of claim 6, wherein the sampling of the accelerometer is performed for a given period of time, and wherein the sampling of the ultrasonic sensor is performed for the given period of time.

8. The method of claim 7, further comprising performing a Fast Fourier Transform (FFT) operation on the accelerometer data to produce first FFT output data and performing a FFT operation on the ultrasonic sensor data to produce second FFT output data, and wherein the generating the alert is based at least in part on the first FFT output data and the second FFT output data.

9. The method of claim 8, further comprising using a machine learning classifier to indicate a likelihood that a water hammer event occurred and wherein the generating the alert is based at least in part an output of the machine learning classifier.

10. The method of claim 9, wherein the machine learning classifier is a neural network.

11. A non-transitory computer-readable medium containing computer executable instructions that, when executed by a processor, cause the processor to perform a method for generating an alert of an event in a steam pipe, the method comprising:

obtaining temperature measurements of the steam trap;

sampling an accelerometer coupled to a steam pipe to provide accelerometer data;

determining that the accelerometer data meets or exceeds a threshold;

in response to the determining that the accelerometer data meets or exceeds the threshold:

increasing the sample frequency at which the accelerometer is sampled; and sampling an ultrasonic sensor to provide ultrasonic sensor data;

detecting a failed closed steam trap by detecting no accelerations in the steam trap, detecting decreased ultrasonic noise based on the ultrasonic sensor data, and detecting a drop in temperature of the steam trap;

generating an alert that of the failed closed steam trap;

receiving a plurality of alerts that a water hammer event has occurred;

determining that a period of time has passed since a first of the plurality of alerts was received; and in response to determining that the period of time has passed, comparing data from multiple sensor modules to identify one of the multiple sensor modules that is closest to the water hammer event.

12. The non-transitory computer-readable medium of claim 11, wherein the sampling of the accelerometer is performed for a given period of time, and wherein the sampling of the ultrasonic sensor is performed for the given period of time.

13. The non-transitory computer-readable medium of claim 12, wherein the method further comprises performing a Fast Fourier Transform (FFT) operation on the accelerometer data to produce first FFT output data and performing a FFT operation on the ultrasonic sensor data to produce second FFT output data, and wherein the generating the alert is based at least in part on the first FFT output data and the second FFT output data.

14. The non-transitory computer-readable medium of claim 13, wherein the method further comprises using a machine learning classifier to indicate a likelihood that a water hammer event occurred and wherein the generating the alert is based at least in part an output of the machine learning classifier.

15. The non-transitory computer-readable medium of claim 14, wherein the machine learning classifier is a neural network.

\* \* \* \* \*